United States Patent
Kakumani et al.

(10) Patent No.: US 7,376,945 B1
(45) Date of Patent: May 20, 2008

(54) SOFTWARE CHANGE MODELING FOR NETWORK DEVICES

(75) Inventors: Badari Kakumani, San Jose, CA (US); Glen Darling, San Jose, CA (US); Matthew Balint, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 452 days.

(21) Appl. No.: 10/727,099

(22) Filed: Dec. 2, 2003

(51) Int. Cl.
*G06F 9/44* (2006.01)

(52) U.S. Cl. ...................................... 717/171; 717/135

(58) Field of Classification Search ......... 717/169–178
See application file for complete search history.

(56) References Cited

U.S. PATENT DOCUMENTS

| | | | |
|---|---|---|---|
| 5,325,533 A | 6/1994 | McInerney et al. | |
| 5,487,066 A | 1/1996 | McNamara et al. | |
| 5,754,858 A | 5/1998 | Broman et al. | |
| 5,842,011 A | 11/1998 | Basu | |
| 5,860,004 A | 1/1999 | Fowlow et al. | |
| 5,948,101 A | 9/1999 | David et al. | |
| 5,953,533 A * | 9/1999 | Fink et al. ................... | 717/175 |
| 5,960,200 A | 9/1999 | Eager et al. | |
| 5,999,740 A | 12/1999 | Rowley | |
| 6,178,546 B1 | 1/2001 | McIntyre | |
| 6,202,207 B1 * | 3/2001 | Donohue .................... | 717/173 |
| 6,314,565 B1 * | 11/2001 | Kenner et al. ............... | 717/171 |
| 6,324,691 B1 | 11/2001 | Gazdik | |
| 6,381,735 B1 | 4/2002 | Hunt | |
| 6,381,742 B2 | 4/2002 | Forbes et al. | |
| 6,611,727 B2 * | 8/2003 | Bickley et al. ................ | 700/99 |
| 6,651,186 B1 | 11/2003 | Schwabe | |
| 6,658,659 B2 | 12/2003 | Hiller et al. | |
| 6,675,382 B1 | 1/2004 | Foster | |
| 6,742,028 B1 | 5/2004 | Wang et al. | |
| 6,854,009 B1 | 2/2005 | Hughes | |
| 6,871,344 B2 | 3/2005 | Grier et al. | |
| 6,886,029 B1 * | 4/2005 | Pecus et al. ................. | 709/203 |
| 6,928,579 B2 * | 8/2005 | Aija et al. ..................... | 714/6 |

(Continued)

OTHER PUBLICATIONS

Brada, Přemysl, "Metadata Support for Safe Component Upgrades," Proceedings of the 26th Annual International Computer Software and Applications Conference '02, IEEE 2002, 5 pages.

(Continued)

*Primary Examiner*—Wei Zhen
*Assistant Examiner*—Phillip H Nguyen
(74) *Attorney, Agent, or Firm*—Hickman Palermo Truong & Becker LLP

(57) ABSTRACT

A method for software change modeling for network devices provides dynamic (on the device) and static (computer) change modeling. The same source code and libraries are used for both modeling applications, allowing a user to see the impact of activating or deactivating specific software modules without affecting the actual node. A master node passes a node the identity of the software package(s) to be updated and the dependencies. The node notifies its running processes about the update. If any of the processes determine that the update will degrade or have a negative impact on the operation of the node, it returns a veto to the node which sends a list of the processes that are impacted along with the reasons why to the master node.

25 Claims, 12 Drawing Sheets

U.S. PATENT DOCUMENTS

| | | |
|---|---|---|
| 7,013,461 B2 | 3/2006 | Hellerstein et al. |
| 7,080,371 B1 | 7/2006 | Arnaiz et al. |
| 7,203,937 B1 | 4/2007 | Kyle et al. |
| 7,240,336 B1 * | 7/2007 | Baker .......................... 717/135 |
| 2002/0019972 A1 | 2/2002 | Grier et al. |
| 2002/0099845 A1 | 7/2002 | Passanisi |
| 2002/0100036 A1 | 7/2002 | Moshir et al. |
| 2002/0133814 A1 | 9/2002 | Bourke-Dunphy et al. |
| 2002/0144248 A1 | 10/2002 | Forbes et al. |
| 2002/0174420 A1 | 11/2002 | Kumar |
| 2002/0174422 A1 * | 11/2002 | Kelley et al. ................ 717/178 |
| 2003/0088650 A1 | 5/2003 | Fassold et al. |
| 2003/0110482 A1 * | 6/2003 | Ferguson et al. ........... 717/168 |
| 2003/0172135 A1 | 9/2003 | Bobick et al. |
| 2003/0212990 A1 | 11/2003 | Brodkorb et al. |
| 2003/0217193 A1 | 11/2003 | Thurston et al. |
| 2004/0003266 A1 | 1/2004 | Moshir et al. |
| 2004/0019596 A1 | 1/2004 | Taylor et al. |
| 2004/0019897 A1 | 1/2004 | Taylor et al. |
| 2004/0049509 A1 | 3/2004 | Keller et al. |
| 2004/0133875 A1 | 7/2004 | Kramer |
| 2004/0268302 A1 | 12/2004 | Srivastava et al. |
| 2005/0022182 A1 * | 1/2005 | Mittal .......................... 717/178 |
| 2005/0055692 A1 | 3/2005 | Lupini et al. |
| 2005/0198629 A1 | 9/2005 | Vishwanath |

OTHER PUBLICATIONS

Ganger, Gregory R. et al., "Soft Updates: A Solution to the Metadata Update Problem in File Systems," ACM Transactions on Computer Systems, vol. 18, No. 2, May 2000, pp. 127-153.

Meijer, Erik et al., "Overcoming Independent Extensibility Challenges," Communications of the ACM, Oct. 2002, vol. 45, No. 10, pp. 41-44.

Definition of API from Google.com, retrieved Apr. 11, 2006.

Oreizy, Peyman, et al., "Architecture-Based Runtime Software Evolution", Information and Computer Science, University of California, Irvine, Jun. 1998, pp. 177-186.

* cited by examiner

SOFTWARE CHANGE MODELING FOR NETWORK DEVICES

FIELD OF THE INVENTION

The present invention generally relates to the management, loading, and installation of select software modules onto networked nodes. The invention relates more specifically to a method and apparatus for the modeling of software packages for a distributed networking device.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networked computer systems have evolved over the years from simple serially connected computer systems to massively networked computer systems connected via large intranets and the Internet. During this evolution, many different concepts were developed to manage and load core operating software for client computer systems. The issue of how a computer system obtains its operating software and the effects upon the overall networked system by the loading of new operating software on the computer system has been a complex and perplexing problem.

Heterogeneous multi-computer systems, or multi-node systems, contain a number of computer systems that have differing purposes and different software code bases. For example, the current install base of Windows from Microsoft Corporation of Redmond, Wash., encompasses many different versions of Windows distributed across a wide variety of computers. Microsoft maintains servers that store versions of the supported Windows operating system software. A Windows computer periodically queries a server with its current software versions and the server identifies software components that require updates.

Whenever a Windows computer requires a software update of core operating software, the computer notifies the user that an update is required and the user selects the software component(s) to download. The computer then downloads the software component(s) from a main server and installs each component's library modules and code. The computer must then be restarted to complete the component update and execute the new code. This requires that all processes on the computer be halted and restarted, thereby interrupting any tasks that the computer may be performing.

However, if a multi-node system is purposed to perform an uninterruptible operation, such as managing telecommunications links, the restarting of a computer is not acceptable because a telecommunications link will be disturbed. The computer must also be running an operational version of Windows to be able to communicate with the server, therefore, a new computer is useless until a copy of Windows is installed by a user. Further, the reliance on a human being to perform software selection and initiate software downloads is not desirable in stand-alone systems.

Sun Microsystems of Mountain View, Calif., originally created the concept of diskless workstations that performed diskless booting. A server was provided that hosted a single operating system image that was targeted for a homogeneous set of client workstations. When a workstation booted from its resident BIOS, it would connect to its network and request a copy of the operating system image from the server. In response to the request, the server would send the image to the client. The client would load the image into its local memory and boot from the local memory. This approach worked well for homogeneous systems, but could not work with heterogeneous systems. It further required that an entire operating system image be downloaded to a client workstation and did not take into account the problem of managing and updating individual core software components.

Bootstrap protocol, or BOOTP, is an Internet protocol that was developed to allow a host workstation to configure itself dynamically at boot time. BOOTP enables a diskless workstation to discover its own IP address, detect the IP address of a BOOTP server on the network, and find a file on the BOOTP server that is to be loaded into memory to boot the machine. This enables the workstation to boot without requiring a hard or floppy disk drive. However, this approach has the same shortcomings of the Sun Microsystems approach.

The Beowulf Project began at the Goddard Space Flight Center (GSFC) in the summer of 1994. The Beowulf Project was a concept that clustered networked computers running the Linux operating system to form a parallel, virtual supercomputer. It has been demonstrated to compete on equal footing against the world's most expensive supercomputers using common off the shelf components.

Beowulf divides a program into many parts that are executed by many networked computers. For example, all of the nodes in a connected set of computers run on Linux and have a program installed that performs a series of complex calculations. A lead node begins executing the program. The lead node separates the calculations into a number of tasks that are each assigned to a node in the network. While the lead node performs its calculation task, the other nodes are also performing theirs. As each node completes its task, it reports the results to the lead node. The lead node then collects all of the results. This approach is well suited for performing a series of tasks that can be shared among a group of networked computers. However, the drawback to this approach is that it requires that an identical program be distributed to all of the networked computers and it does not contemplate the problems associated with a heterogeneous set of computers that require individual software component updates, nor the management of such components.

Based on the foregoing, there is a clear need for a system that provides for the management of component-level operating software and nodal downloading of such software for a multi-node networked computer system. Additionally, the system would allow a node to identify versions of the software components that it requires to operate and verify its software components with a master node.

There is also a need for a system that allows for the installation of operating software components onto a node during runtime without requiring the node to perform a restart or reboot sequence. Further, there is a need for a system to create the software components and model the effects of updating such components upon a node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
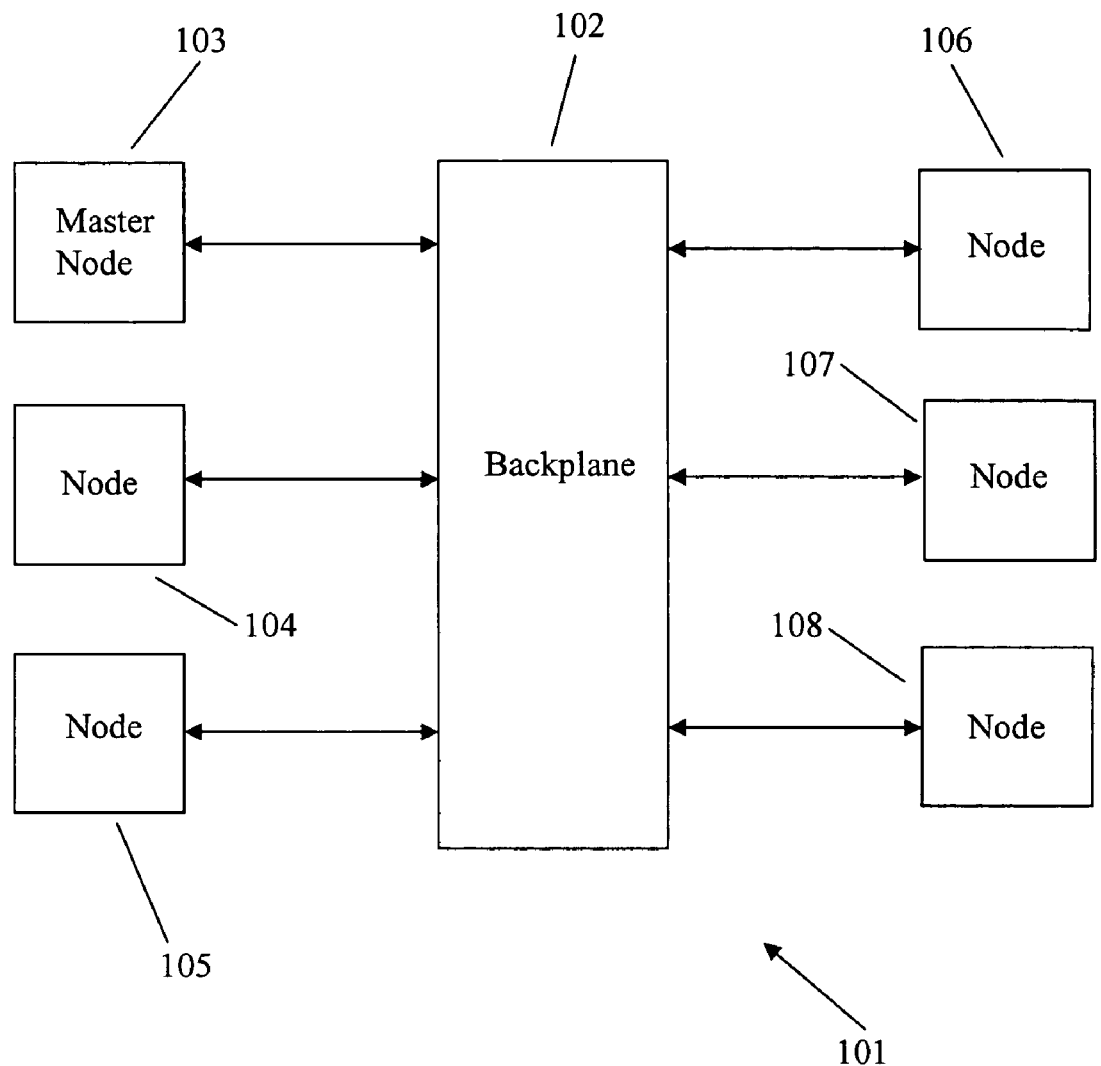
FIG. 1 is a block diagram that illustrates a multi-node router system where nodes communicate through a backplane to perform software loading and initialization according to the invention.

A method and apparatus for software change modeling for network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
   2.1 Dynamic Loading, Installation, and Activation of Software Packages in a Router System
   2.2 Dynamic Loading, Installation, and Activation of Software Packages in a Networked Computer System
   2.3 Master Node Interaction
   2.4 Software Package Breakdown and Loading
   2.5 Task Analysis of a Dynamic Loading, Installation, and Activation System
   2.6 Development and Build Environment for Packaged Software Delivery to Network Devices
   2.7 Software Change Modeling for Network Devices in a Dynamic Loading, Installation, and Activation System
3.0 Implementation Mechanisms-Hardware Overview
4.0 Extensions and Alternatives

1.0 GENERAL OVERVIEW

The needs identified in the foregoing Background, and other needs and objects that will become apparent for the following description, are achieved in the present invention, which comprises, in one aspect, a method for software change modeling for network devices.

The invention provides dynamic (executed directly on the networked devices) and static (executed externally on a stand-alone computer) change modeling. The same source code and libraries are used for the dynamic and static modeling applications. This allows a user to see the impact of activating or deactivating certain modules without affecting the actual node.

Dynamic modeling gives the user command line access to the master node in a distributed network of nodes. The master node allows the user to invoke operations upon a node in the network. The user initiates a software update by installing a composite image onto the master node. The user indicates to the master node what nodes and which software package(s) are to be updated. The software package(s) may indicate the type of nodes to which they apply. The composite image may also contain a list of software packages destined for each node.

The user may optionally instruct the master node to perform the software update using a test mode where the update is not put into effect.

The master node notifies the node that a software update is being requested. The master node passes the node the identity of the software package(s) to be updated and the package dependencies.

The node examines the package identifiers and the dependencies. It determines the running processes that will be affected by the update. The node notifies processes that have indicated interest in updates that the update is being requested. These processes evaluate the effect that the update will have on their operation. If any of the processes determine that the update will degrade or have a negative impact on the operation of the node, the process will return a veto to the node. If there are no negative effects, the process will return an acceptance of the update to the node.

The node waits for the processes to return the results of their evaluations. If any processes veto the update the node returns a veto to the master node and a list of the processes that are impacted along with the reasons why. Otherwise, the node returns an acceptance to the master node.

The master node reports the results to the user. If there were any nodes that vetoed the update, the master node displays the node identifier and the processes that are impacted and their reasons to the user.

The static simulator uses the same software components normally run on the master node but executes them on a stand-alone computer system. The simulator can calculate the impact of a software change operation on a specific type of node given information about the current software configuration of that node. That is, the user tells the simulator the current software configuration by providing the original software images. The user must also indicate the type of the node being analyzed. Then the user may request the simulation of any software update by providing the updated software image. Software downgrades may be similarly simulated.

In other aspects, the invention encompasses a computer apparatus and a computer-readable medium configured to carry out the foregoing steps.

2.0 STRUCTURAL AND FUNCTIONAL DESCRIPTION

2.1 Dynamic Loading, Installation, and Activation of Software Packages in a Router System Multi-node computer systems encompass many different configurations. A common multi-node system is exemplified in telecommunications switches and routers. Shelf or rack-based routers contain many different types of processors in the cards that plug into the shelf. A master control card will typically have a different control processor than the line cards installed in the shelf. The master control card controls the operations of the line cards and typically requires a more powerful processor than the line cards. Further, each line card may have a different control processor configuration depending on the line card's purpose.

The cards in the shelf are interconnected through a backplane that provides an isolated and custom network between the cards. There may also be multiple shelves interconnected via the backplanes to perform large routing tasks.

There is a need to distribute, and then make persistent, a chosen set of system software entities onto each card (node) in a multi-node router system. The fact that the system software is composed of sets of modular components, and not single monolithic images, makes this even more challenging. FIG. 1 shows an embodiment of the invention implemented in a router system 101. The router system 101 uses a backplane 102 to interconnect all of the nodes 103-108 in the system. Backplanes are communicably connected together to form multi-shelf systems. A master node 103 is typically the most advanced processor card in the shelf. Other nodes 104-108 are line cards or other assorted cards having possibly different processors controlling each card's functions.

Each node communicates across the backplane 102. The master node 103 detects each card type and location through the backplane's 102 hardware.

The invention's master node 103 stores information regarding each card's type and software configuration. The master node 103 also stores versions of software packages that are used by the nodes in the router system 101. When the router system 101 first boots up, the master node is tasked with loading and initializing each node with the proper versions of software. It is the software loading and initialization phase that brings the router system 101 to a steady state during the boot stage of the system. Each node requires a potentially unique boot image, plus a modular set of potentially unique software packages, to make it complete and functional. The invention's infrastructure is capable of delivering software files that match the diversity of requirements of individual nodes.

The boot image and the software packages need to be burned into local persistent storage, e.g., flash memory, on each node 104-108 before the router system 101 can be declared "ready for use". Once ready for use, recovering from a power outage, for example, takes a minimal amount of time regardless of the number of nodes in the system, thereby providing a turnkey system.

The invention dynamically adjusts, at the time that a node starts, the particular software that the node receives and boots up with. In a pristine system, each node 104-108 is a blank slate and requires software to be loaded for it to operate. The master node 103 becomes aware of the node through a hardware register on the backplane 102 or through a message from the node as it boot ups from its basic BIOS.

The master node 103 communicates with a node 104 after the node 104 boots up with an appropriate boot image downloaded from the master node 103. The node 104 requests a software package download from the master node 103. The master node determines the node's card type and/or location and, based on the master node's stored node configuration database, the master node 103 determines the proper software required for the node 104. The master node 103 then retrieves the proper software packages and boot software from its storage and sends the packages to the node 104.

The node 104 receives the software packages and, based on a command from the master node 103, can cache, or store, the software packages in its local persistent storage device along with the software package version information and dependencies extracted from the software packages. The node 104 then boots up into normal operational mode using the software packages.

The purpose of a node not storing the software packages in its persistent storage device allows the master node 103 to download test software packages to the node and temporarily run the node using the test software. When the node reboots, the test software will no longer exist on the node.

Once nodes within the router system 101 have been initialized, the invention can still dynamically adjust a node's software configuration. A node will negotiate with the master node 103 as to what software it will boot with each time it boots. The master node 103 decides whether the node's current software packages are current and whether any software package updates are required.

Most shelf-based router systems use multiple master nodes to ensure failover operational reliability. A master node is selected by the user or is elected by other potential master nodes. Line cards, on the other hand, do not have to be redundant, but therefore require the ability to run in a continuous manner.

During normal runtime, the invention dynamically updates a node's software configuration. Software updates must occur in a manner that does not disrupt a node's operation. A small glitch or hiccup in the node's operation can, for example, cause a routing connection to lose data or drop entirely. Therefore, software packages must be constructed so that a software package can be updated during runtime in such a way that the package can be replaced and restarted without causing the node to restart or halt its operations. This is discussed in detail below.

The master node 103 tracks software updates made by the user. The user loads software update package(s) onto the master node 103 and tells the master node 103 to update a specific node, a set of nodes, or all nodes. The master node 103 then communicates with a node 104 with a message that tells the node 104 that an update is desired. The message tells the node 104 what the software package will contain and the software dependencies of the package.

Each node 104-108 has the intelligence to evaluate the dependencies of software packages. A software package can be dependent upon a certain library or software module. A software package can also be depended upon by other software modules already installed, e.g., the software package may contain a library. This means that the update of the software package would require the software modules that depend upon the software package be restarted. If the node 104 believes that updating the software package would not be disruptive, it tells the master node 103 that it will accept the update.

The master node 103 then sends the software package to the node 104. The node 104 can store the software package in its local persistent storage and replace the old software module(s) with the module(s) contained in the software package and restarts the module(s). The node 104 can also not store the software package in its local persistent storage and instead execute the new modules. This allows the user to execute test software on the node 104. The user can later instruct the node 104, via the master node 103, to regress back to the modules stored in its local persistent storage.

If the node 104 believes that updating the software package would be disruptive to its operations, then it notifies the master node 103 that the update is not acceptable. The master node 103 does not send the software package to the node 104 and notifies the user that the update will disrupt the operation of the node 104. The user then has a choice whether to not perform the update or to force the update upon the node 104. If the user decides to force the update of the node 104, then the node 104 will be forced to update and restart.

This decision process also occurs when multiple nodes are to be updated. If one node rejects the update, then none of the nodes are updated until the user makes a decision. The user can update all of the nodes that indicate no disruptive effect and skip the other nodes, force the update of all of the nodes, or skip the update entirely.

Figure 2:
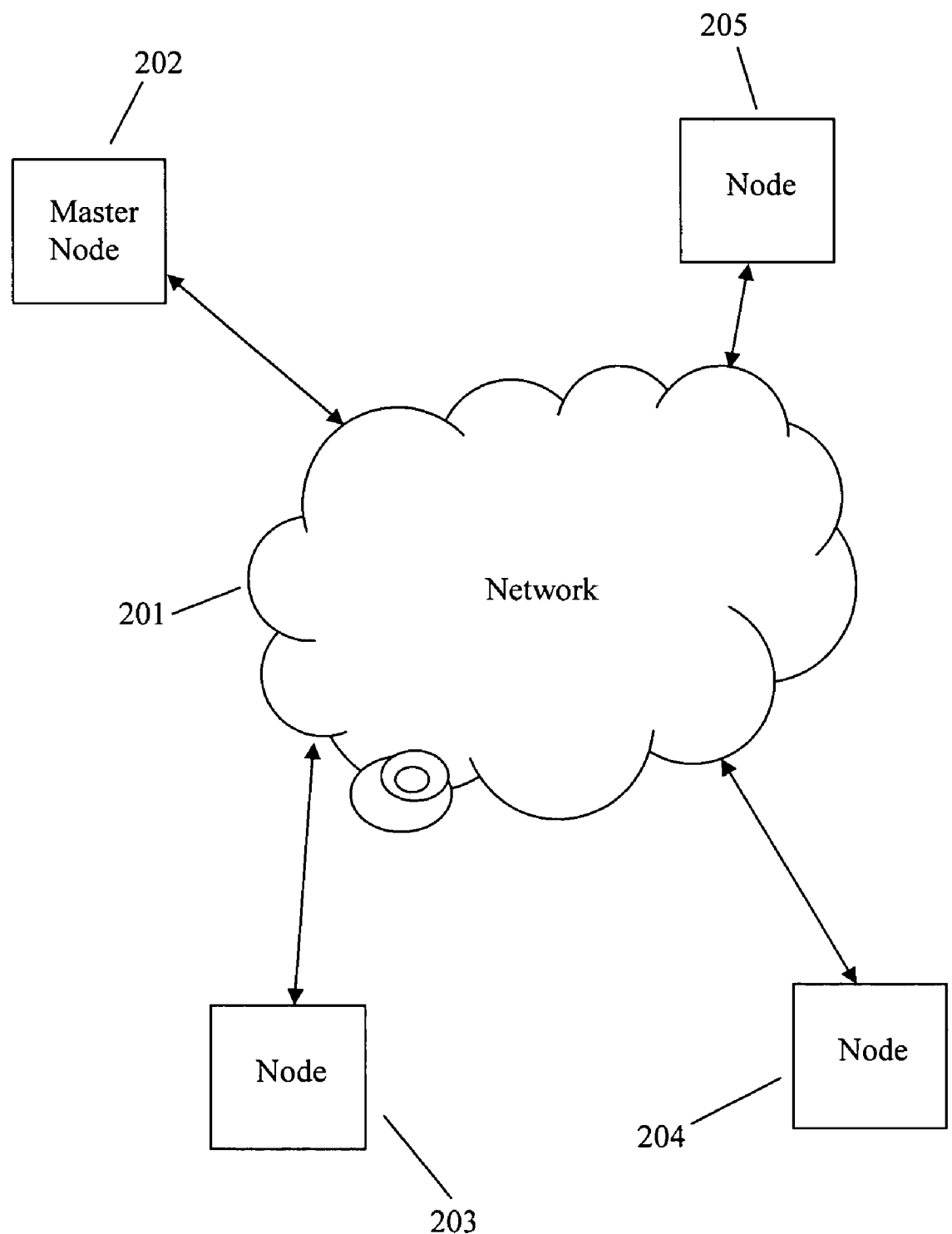
FIG. 2 is a block diagram that illustrates a multi-node computer system where nodes communicate through a computer network to perform software loading and initialization according to the invention.

2.2 Dynamic Loading, Installation, and Activation of Software Packages in a Networked Computer System Referring to FIG. 2, the invention can be extended to a more common computer network 201 such as an intranet or the Internet. A master node 202 communicates across the computer network 201 with nodes 203-205. The master node 202 initializes the nodes 203-205 at boot phase. The master node 202 detects a node's presence on the computer network 201 via a message sent from the node 203 to the master node 202.

The master node 202 receives the node's type information from the node 203. On initial boot, the master node 202 sends the node 203 boot software and software packages appropriate for the node's processor type and/or location. The node 203 reboots into the boot software and requests a software version verification from the master node 202. The master node 202 retrieves the appropriate software package version information for the node from its database using the node's type information. The master node verifies the software version information and tell the node 203 to continue booting.

The node 203 can cache the software packages in its local persistent storage device along with the software package version information and dependencies extracted from the software packages.

Alternatively, on initial boot, the master node 202 sends the node 203 boot software appropriate for the node's processor type. The node 203 reboots into the boot software and requests a software package download from the master node 202. The master node 202 retrieves the appropriate software packages for the node using the node's type information. The master node then sends the retrieved software packages to the node 203.

The node 203 receives the software packages and (as discussed above), based on a command from the master node 202, can cache, or store, the software packages in its local persistent storage device along with the software package version information extracted from the software packages. The node 203 executes the software packages to begin normal operation.

In another alternative embodiment, on initial boot, the master node 202 sends the node 203 boot software appropriate for the node's processor type and/or location. The node 203 uncompresses the boot image and places it into RAM. The node 203 reboots into the boot software and requests a software package download from the master node 202. If the node 203 finds that it is to save a boot image in its persistent storage, it will request a boot software download also. The master node 202 retrieves the appropriate software packages (and boot software, if requested) for the node using the node's type and/or location information. The master node then sends the retrieved software packages (and boot software, if requested) to the node 203.

The node 203 receives the software packages and (as discussed above), based on a command from the master node 202, can cache, or store, the software packages (and boot software, if required) in its local persistent storage device along with the software package version information extracted from the software packages. The node 203 executes the software packages to begin normal operation.

The purpose of a node not storing the software packages in its persistent storage device is that it allows the master node 202 to download test software packages to the node and temporarily run the node using the test software. When the node reboots, the test software will no longer exist on the node.

The invention can dynamically adjust a node's software configuration. A node will negotiate with the master node 202 as to what software it will boot with each time it boots. The master node 202 decides whether the node's current software packages are current and whether any software package updates are required.

The dynamic adjustment of a node's software configuration also occurs during runtime. Software updates occur in a manner that does not disrupt a node's operation. Software packages are constructed so that a software package can be updated during runtime in such a way that the package can be replaced and restarted without causing the node to restart or halt its operations.

The master node 202 tracks software updates made by the user. The user loads software update package(s) onto the master node 202 and tells the master node 202 to update a specific node, a set of nodes, or all nodes. The master node 202 stores the update software packages along with the boot images and software packages already stored on the master node 202. The master node 202 communicates with a node 203 across the network 201 with a message that tells the node 203 that an update is desired. The message tells the node 203 what the software package will contain and the software dependencies of the package.

Each node 203-205 has the intelligence to evaluate the dependencies of software packages. The node 203 checks the dependencies of the software update against the software module dependencies of its modules that it has stored in its local persistent storage device. If the node 203 believes that updating the software package would not be disruptive, it tells the master node 202 that it will accept the update.

The master node 202 then sends the software package to the node 203. The node 203 can store the software package in its local persistent storage and replace the old software module(s) with the module(s) contained in the software package and restart the module(s). The node 203 can also not store the software package in its local persistent storage and instead execute the new modules. This allows the system administrator to execute test software on the node 203. The system administrator can later instruct the node 203, via the master node 202, to regress back to the modules stored in its local persistent storage. The node 203 will then execute the specified modules stored in its local persistent storage.

The invention allows a system administrator to maintain an entire network of computers as well as perform incremental updates and test individual nodes within the network. This lowers maintenance costs to the company or provider.

If the node 203 believes that updating the software package would be disruptive to its operations, then it notifies the master node 202 that the update is not acceptable. The master node 202 does not send the software package to the node 203 and notifies the system administrator that the update will disrupt the operation of the node 203. The system administrator then has a choice whether to not perform the update or to force the update upon the node 203. If the system administrator decides to force the update of the node 203, then the node 203 will be forced to update and restart.

This decision process also occurs when multiple nodes are to be updated. If one node rejects the update, then none of the nodes are updated until the system administrator makes a decision. The system administrator can update all of the nodes that indicate no disruptive effect and skip the other nodes, force the update of all of the nodes, or skip the update entirely.

2.3 Master Node Interaction

Figure 3:
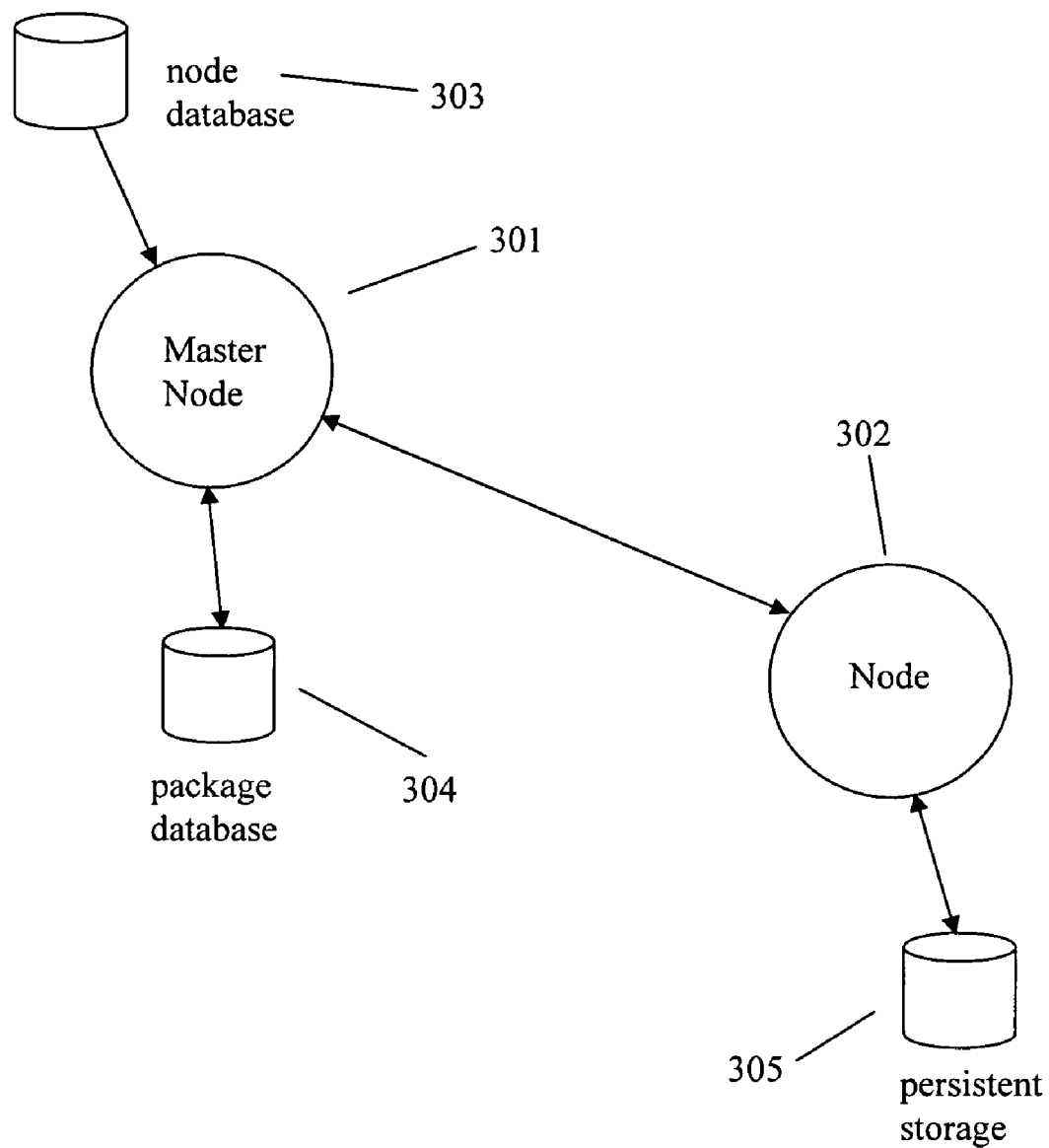
FIG. 3 is a block diagram that illustrates a master node and its associated databases communicating with a networked node according to the invention.

FIG. 3 shows a master node 301 interacting with a node 302. The master node 301 contains a database of software packages 304 that contains versions of software packages that can be used by nodes in the network. Each software package contains metadata that describes the package, its dependencies, and version number. Software packages range from the base operating system to operating software that controls the node's ability to operate, for example, to switch circuits for routing a connection through a backplane.

A second database 303 contains information pertaining to what software is on the nodes that are connected to the master node 301. The master node 301 tracks the software configuration of each of the nodes. The master node 301 has the ability to categorize nodes into classes. All of the nodes in a particular class of nodes can have the same software configuration. Classes may contain nodes that have differing processor types. The master node 301 distributes software packages that are specific to each node's processor type and function. This allows the master node 301 to easily update all nodes within a class. The invention has a broad flexibility to have differing software configurations within a class of nodes or an individual node.

The master node 301 can place a specific node 302 into a test mode by telling the node to download a certain test suite from the master node 301. The node database 303 allows the master node 301 to track special case nodes as well as a normal operation node.

The invention also allows a user to designate the software packages for single nodes or classes of nodes through the master node 301.

The node 302 can store software packages, version information, and dependency information of software packages in its local persistent storage 305. The master node 301 instructs the node 302 when to perform such an operation.

When a node 302 boots up with software packages and version information stored in its local storage 305, the node 302 negotiates with the master node 301 to decide what software packages to use. The node 305 passes the software version information that it believes it should be running to the master node 301. The master node 301 checks with its node database 303 to determine the proper software packages for the node 302. If the node has the proper software packages, the master node tells the node to boot using its resident software packages.

If the node 302 does not have the proper software packages, then the master node instructs the node 302 to download specific versions of software packages from the master node 301. The node 302 is instructed by the master node 301 to save the software packages and associated version information in its local storage 305.

During normal runtime, the node 302 can be updated with software packages by the master node 301. The software packages are structured such that the update of a software package does not cause the node 302 to restart. Most software modules that are running as a process in the node 302 have code in them that is able to evaluate whether a software update that affects it operation will cause the process to restart or if the process itself is being updated, whether its own restart will cause the node 302 to interrupt operations or restart.

The user installs an update on the master node 301. The master node 301 stores the software packages for the update in its package database 304. The user then instructs the master node 301 which nodes are to be updated, or the update can contain the node type that require updating. The master node 301 then refers to its node database 303 to check which nodes will be affected by the update. The master node 301 then sends the node 302 information pertaining to the update. The node 302 receives at least identifiers for the software modules that are being updated and the dependencies of the modules.

An update process in the node 302 notifies processes that are listed in the dependencies that an update of the particular modules is being requested. Each process responds back to the update process with an indicator that tells it if the update will severely affect the node's operations. If any of its processes report that the update will impact the node's operations, the node will veto the update, otherwise it will accept the update. The node 302 responds to the master node 301 with the result.

If the master node 301 receives a veto from the node 302, then the master node 301 does not update the node 302 and notifies the user that the update will adversely affect the node 302. If the user was updating more than one node, the update will not occur if a node vetoes the update. The user must then make the decision whether to update some or all of the nodes, or to abort the update.

If the master node 301 receives an acceptance from the node 302, then the master node 301 sends the software package to the node 302. The node 302 installs the software package by either running the software package's modules or first storing the software packages in its persistent storage 305. If the node 302 immediately runs the software package's modules without storing the software package in the persistent storage 305, then the node 302 can later regress back to the previous modules stored in the persistent storage 305 if it restarts or the master node 301 tells it to regress.

If the node 302 stores the software package in the persistent storage 305, it also extracts the version information and dependency information of the software package and stores the information in its persistent storage 305. The node 302 then executes the modules in the software package. Each module gracefully restarts, in addition to any affected modules that need to restart as a result of the changeover. A module gracefully restarts by saving any variables that it needs and shutting itself down before being switched over to the new module. The new module is started and it uses any saved variables to bring itself back to the state of the old module.

Some modules may be forcefully restarted. This may occur, for example, when an update is forced upon a node that has vetoed the update or a module is not vital and intelligent enough to restart itself.

Figure 4:
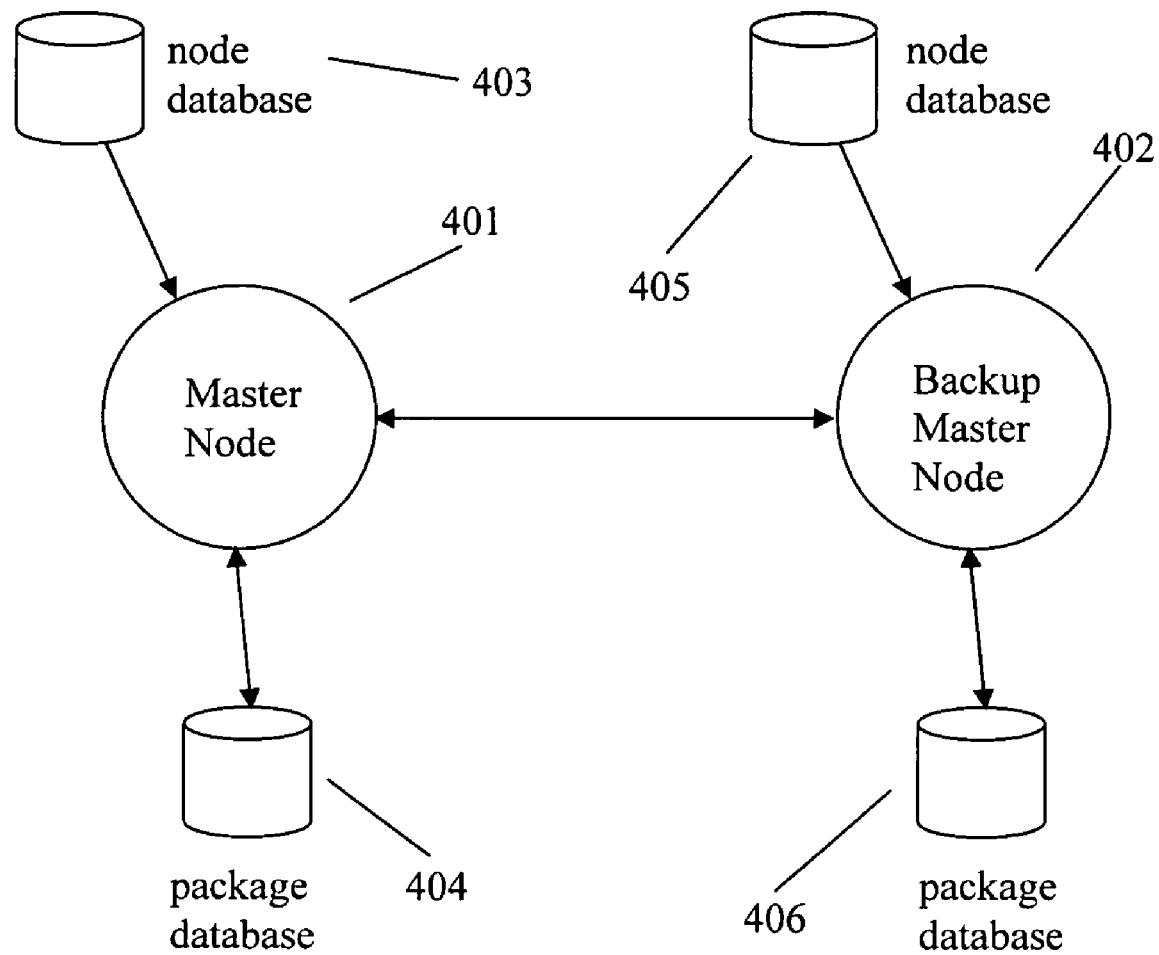
FIG. 4 is a block diagram that illustrates a master node communicating with a backup master node according to the invention.

Referring to FIG. 4, the invention's master node 401 backs up all potential backup master nodes 402 in the system to provide failover redundancy. The master node has a node database 403 and a software package database 404 stored locally. Backup master nodes also have a node database 405 and a software package database 406 stored locally. The master node 401 periodically sends database update information to the backup master node 402. This update can also occur on demand by the backup master node 402 or whenever a database is updated.

The master node 401 sends the backup node 402 node database updates from its node database 403 to the backup master node 402. The backup master node 402 stores the node database updates in its node database 405.

The master node 401 also sends the backup node 402 software package database updates from its package database 404 to the backup master node 402. The backup master node 402 stores the software package database updates in its package database 406.

If the master node 401 goes down or is disabled for any reason during runtime, the backup master node 402 takes over the master node's duties. The master node 401 releases its control and the backup master node 402 becomes the master node.

In the case of multiple backup master nodes, one will be elected by the other nodes to be master node or will assume the master node role. The user can also designate which backup master node will be next in line.

2.4 Software Package Loading

Figure 5:
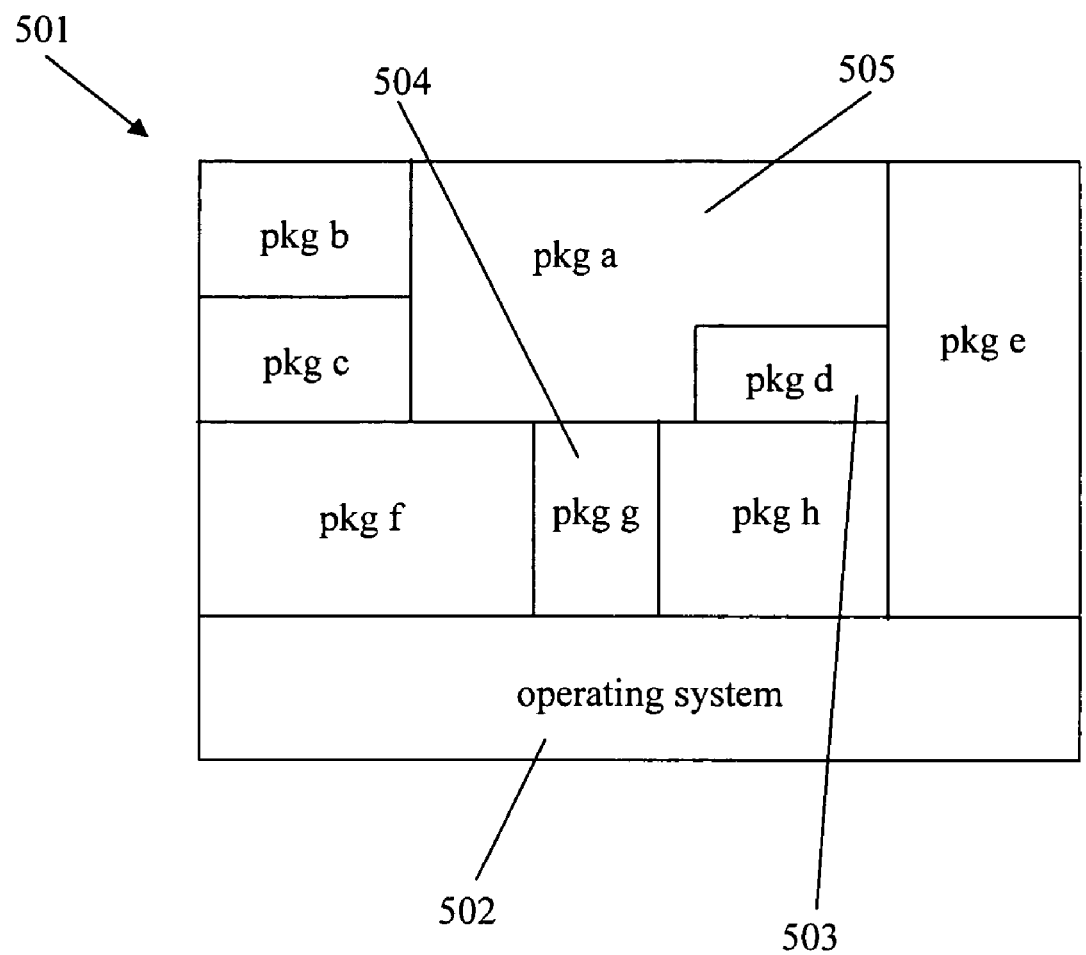
FIG. 5 is a block diagram that illustrates a software entity and its associated software packages according to the invention.

FIG. 5 shows how software entities 501 may be constructed. Each software package is typically intertwined with other packages in their operational modes. A software package is a file containing software and is the delivery vehicle for software upgrades and downgrades. It is a flexible envelope which may contain a single component (also referred to as a module or file), a group of components called a package, or a set of packages. Each component can have a binary signature, such as MD5, that allows the nodes to perform a compare of signatures of files to check what has actually been updated.

Software packages are managed on a master node as a list of package versions per node. Packages are maintained in dependency order with base packages at the end of the list and application packages at the beginning. Packages are structured such that, if the same file is present in many packages, then only the file from the first package in the list will be selected. Some packages are standalone and others are upgrades to another package that replace a subset of its files. Upgrade packages are placed earlier in the package list so that their files replace those from the packages that they upgrade. The dependency order is also configured such that an update will not override a previous package that should not be entirely overridden, for example, if the update affects only one part of a set of modules, the update should not override the entire set. If a package version is changed, any upgrade packages that are only applicable to the old package version are removed. If a new package is activated, it is added to the list before all of the packages that it depends on.

Software packages contain package dependency information describing inter-node and intra-node package version dependencies. Specifically, each package defines which package versions it needs to be present locally and remotely. Dependencies may be differ for different types of nodes. After applying a change to the software sets for all nodes, each node is analyzed by the master node to ensure that the node's local and remote dependencies are all satisfied.

Software packages also include file characteristics such as type (e.g., Dynamic Link Library (DLL), server binary, or parser file), function (e.g., "routing protocol" or "forwarding path plug in library"), and CPU architecture (e.g., "PowerPC", "MIPS", "CPU-neutral"). Each node has a list of desired characteristics which is compared by the master node to each file in the package to determine which subset of files should be sent to a node. The file metadata also includes a contents signature and a list of application program interface (API) providers and consumers.

A node can be instructed to load all software entities 501 in its operational software suite from the master node or it can be instructed to load specific software packages 502-505. The node will boot using the software packages that it has downloaded from the master node.

Each package in the operational software entities 501 has metadata attached to it that is extracted by the node upon receipt. The node saves the version and dependency information when it is told to by the master node. This allows the node to remember what software version state it was in at the last save. The version information is used by the node to negotiate with the master node about what software packages it should be booting with. The dependency information allows the node to evaluate how each software module is affected by software updates.

For example, if pkg g 504 is updated, then the node must find which packages would be affected. The node will see that pkg a 505 is affected and will notify pkg a 505 that pkg g 504 is going to be updated. Pkg a 505 must evaluate if the update of pkg g 504 will cause the node to interrupt operations. If it will affect operations, then pkg a 505 will notify the node that it cannot perform the update, otherwise it will notify the node that it accepts the update.

Software entities are divided into boot images and application packages. A boot image is customized for the type of node and provides basic low-level communications amongst the nodes.

The master node controls the distribution and burning in of software to all nodes in the network. When the user selects the master node, he sets a monitor variable telling the master node to "prepare all nodes now", i.e., burn all nodes now. The user also boots a main composite boot image on that master node.

The composite boot image self-extracts itself on the master node's local storage into boot images for all node types and packages for all node types. All of the other nodes in the system are automatically reset. The nodes then request that they be serviced by the master node with appropriate system software. The appropriate, and potentially unique, boot image and package set are delivered to each node.

Once all nodes have indicated that they are "ready" and that their own software has been persistently stored, the master node initiates a system-wide reset and a warm boot is executed.

The warm boot is equivalent to powering off, then on, the entire system. Each node boots to a certain stage and then waits for validation from the master node.

The master node independently boots and starts validating the software entities persistently stored on each remote node. Once validation is complete, the node will execute its software packages. Since only validation, and not download, is required during the warm boot, a scalable boot architecture is thereby achieved.

During normal runtime, the master node can update software packages on a node by sending the node the software package updates. A node is notified by the master node that a software update is desired and what software package will be updated along with its dependency information. The node evaluates the software update by notifying the processes that will be affected by the update. If any of the processes vetoes the update because the update will cause the node to interrupt operations, then the node will send the veto to the master node. If the processes accept the update, then the node will send the acceptance to the master node.

If the node accepts the update, then the master node sends the software package update to the node. The node commits the update by saving the software package in its persistent storage and executes the software package by halting the proper processes and restarting them using the updated software. The node can optionally not save the software package in its persistent storage when it executes test software.

If the node vetoes the update, the master node notifies the user that the update will cause disruption to the node. The user decides if the update will be performed on the node. If the user decides to continue with the update, the master node will force the node to perform the update and send the node the software package update.

Figure 6:
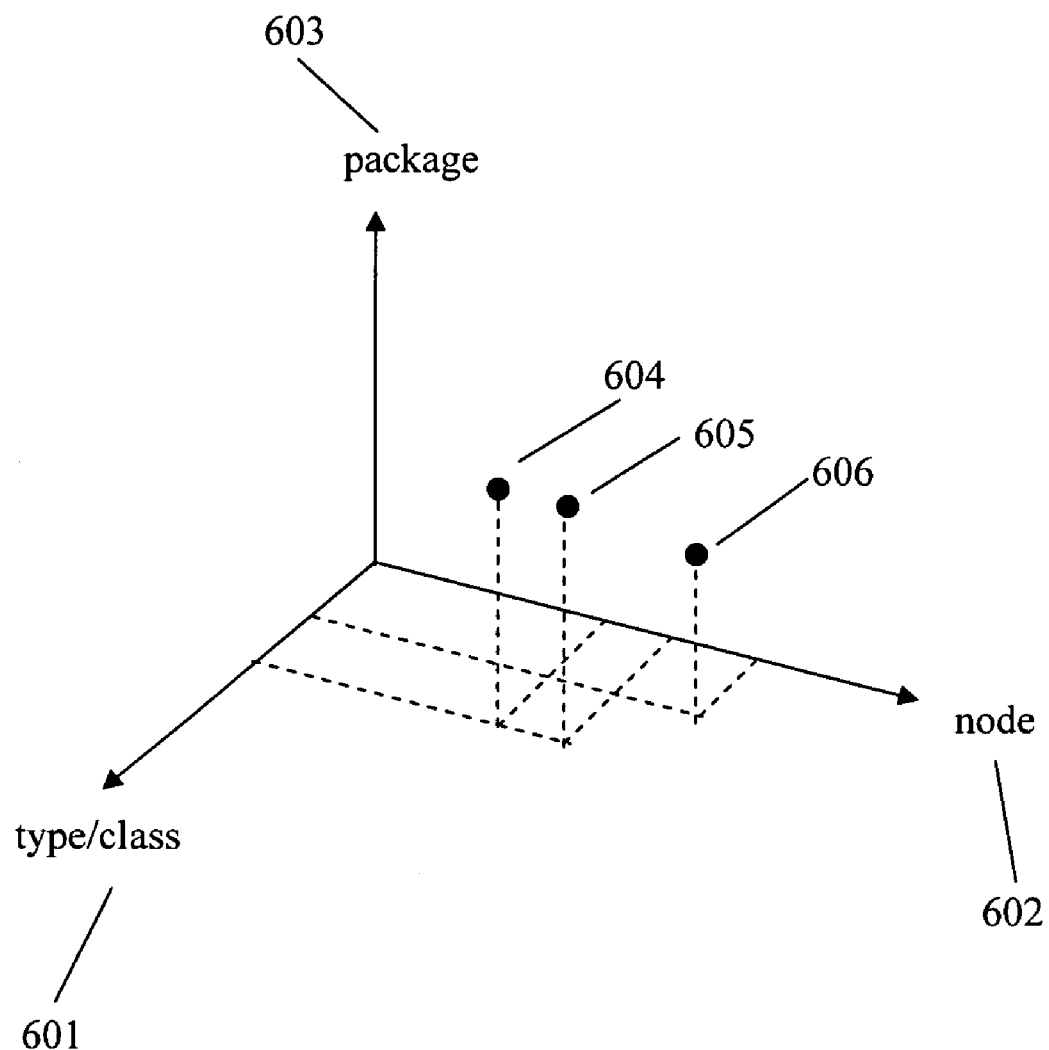
FIG. 6 is a diagram that illustrates a three-dimensional representation of software configurations for nodes and classes of nodes according to the invention.

With respect to FIG. 6, the invention provides a master node with a large amount of flexibility to configure the software configuration of nodes within a system. The master node (or user) can define what software packages 603 are required for a node 602. Nodes can be treated individually or placed in a class 601. The combination of the three characteristics can uniquely define a node's software environment.

For example, nodes A 604 and B 605 are placed in the same class and have the same software package configuration. Node D 606 is a unique node that has its own software package configuration.

2.5 Task Analysis of a Dynamic Loading, Installation, and Activation System

Figure 7:
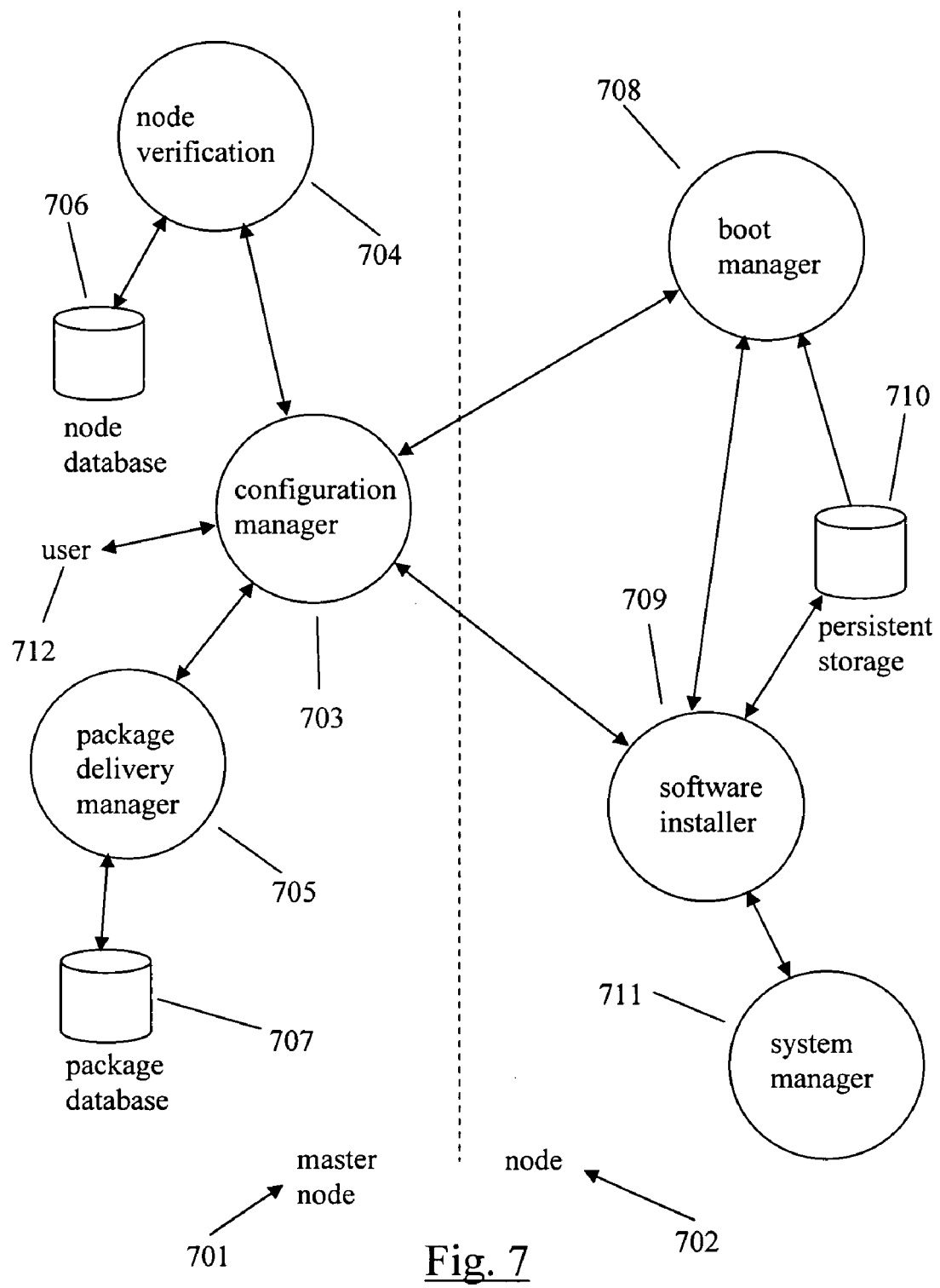
FIG. 7 is a block diagram that illustrates a task viewpoint of a master node and a node according to the invention.

FIG. 7 shows a task oriented viewpoint of the invention's master node 701 and node 702. The user installs a composite image onto the master node which, when executed, creates boot images, software packages, and node information. The software packages contain version information, dependency information, and other metadata information pertaining to the software in the package. The configuration manager module 703 distributes the boot images, software packages, and node information to the proper databases 706, 707. Updates are installed on the master node in the same manner by the user.

The master node 701 provides a node database 706 that records the preferred software version information, type, and other pertinent information (e.g., present/not present, test mode, current installed software versions, etc.) for each node in the system. The node database 706 is preloaded with the preferred software version information by the user via the composite image and is updated as nodes are added or changed. The configuration manager 703 passes the node information obtained from the composite image to the node verification module 704. The node verification module 704 installs the node information into the node database 706.

The master node 701 also provides a package database 707 that contains the software packages and boot images for the nodes in the system. As with the node database 706, the package database 707 is preloaded with the software packages and boot images via the composite image. The configuration manager module 703 passes the boot images and software packages extracted from the composite image to the package delivery manager module 705. The package delivery manager module 705 installs the boot images and software packages into the package database 707. The package delivery manager module 705 compares the binary signature of the modules in the software packages with the corresponding modules stored in the package database 707 to discover which modules have been updated. Any binary signatures that match indicate that the module has not changed. Modules that have different binary signatures replace the modules stored in the package database 707.

The package database 707 is updated in the same manner whenever an update is installed by the user. The package database 707 contains all of the possible boot images and software packages that the nodes in the system will be using as well as older versions that are kept for regressing a node back to a previous boot image or software package version.

The boot manager 708 on the node 702 must boot the node to begin communication with the master node 701. During a pristine boot (when the node has no boot image or software packages stored in its persistent storage 710), once the node 702 is running its base boot code, the node 702 requests a boot image and software package download from the master node 701. The software installation module 709 sends a boot image and software package download request to the configuration manager module 703. The software installer module 709 also sends the configuration manager module 703 the node's type information (e.g., card type, processor type, location, etc.). This step is not performed if the master node 701 has full visibility of the node's type and shelf slot via hardware in a backplane, for example.

Alternatively, the node 702 requests the software packages by providing a list of functional features that the node is interested in (e.g., parser files, processor specific-architecture binaries, routing protocol files, etc.). This means that the selection of the boot image is based on type/location, while the selection of software packages and package contents is based on features. Nodes of the same type may have different feature requirements (and hence receive different software) if, for example, their firmware is programmed differently or they are dynamically assigned a different role.

The configuration manager module 703 sends the node verification module 704 the node's type information to obtain the node's software configuration information. The node verification module 704 finds the node's software configuration information in the node database 706 using the node's type information. The node 702 can be a member of a class which dictates the node's software configuration or can be individually configured. The node verification module 704 passes the node's software configuration information to the configuration manager module 703.

In the alternative embodiment described above, the previous steps change slightly, the configuration manager module 703 sends the node verification module 704 the node's features request to obtain the node's software configuration information. The node verification module 704 creates the node's software configuration information based on the node's requested features by matching the node's requested features with package and file information in the node database 706. The node verification module 704 passes the node's software configuration information to the configuration manager module 703.

The configuration manager module 703 sends the package delivery manager module 705 the node's software configuration information to obtain the proper boot image and software packages for the node 702. The package delivery manager module 705 receives the node's software configuration information and finds the boot image and software packages in the package database 707 using the software version information contained in the node's software configuration information. The package delivery manager module 705 passes the boot image and software packages to the configuration manager module 703.

The configuration manager module 703 sends the boot image and software packages to the software installer module 709. The software installer module 709 stores the boot image and software packages in the persistent storage 710. The software version information is extracted from the software packages and stored in the persistent storage 710. The software installer module 709 signals the boot manager module 708 to reboot the node.

The boot manager module 708 reboots the node into the boot image from the persistent storage 710 and the boot manager module 708 signals the software installer module 709 to verify the software package versions with the master node 701. The software installer module 709 retrieves the stored software version information from the persistent storage 710 and requests verification of the software packages from the configuration manager module 703.

The configuration manager module 703 requests verification of the software version information for the node from the node verification module 704. The node verification module 704 compares the node's software version information with the stored versions for the node and returns the result to the configuration manager module 703. If the node has the correct software, then the configuration manager module 703 notifies the software installer module 709 that it can complete the boot sequence. The configuration manager module 703, in turn, notifies the boot manager module 708 that it can execute the software packages stored in the persistent storage 710.

If the node does not have the correct software versions, the configuration manager module 703 retrieves the correct software packages from the package delivery manager module 705, passing the package delivery manager module 705 the desired software package names and their version numbers. The package delivery manager module 705 finds the software packages in the package database 707 and sends them to the configuration manager module 703. The configuration manager module 703 sends the software packages to the software installer module 709.

The software installer module 709 receives the software packages and stores them in persistent storage 710. The software installer module 709 then notifies the boot manager module 708 that it can continue with the boot phase using the software packages stored in persistent storage 710.

Alternatively, during a pristine boot, the node 702 runs its base boot code and requests a boot image from the master node 701. The boot manager 703 sends a boot image download request to the configuration manager module 703. The configuration manager module 703 sends the node verification module 704 the node's type information to obtain the node's software configuration information. The node verification module 704 finds the node's software configuration information in the node database 706 using the node's type information. The node verification module 704 passes the node's software configuration information to the configuration manager module 703.

The configuration manager module 703 sends the package delivery manager module 705 the node's software configuration information to obtain the proper boot image for the node 702. The package delivery manager module 705 receives the node's software configuration information and finds the boot image in the package database 707 using the software version information contained in the node's software configuration information. The package delivery manager module 705 passes the boot image and software packages to the configuration manager module 703.

The configuration manager module 703 sends the boot image to the boot manager 703. The boot manager 703 executes the boot image.

Once the boot image is running, the software installation module 709 sends a boot image and software package download request to the configuration manager module 703. A boot image request is made if the node 702 finds that it is configured to save a boot image in the persistent storage 710. The software installer module 709 also sends the configuration manager module 703 the node's type information (e.g., card type, processor type, location, etc.). This step is not performed if the master node 701 has full visibility of the node's type and shelf slot via hardware in a backplane, for example.

Alternatively, the node 702 requests the software packages by providing a list of functional features that the node is interested in (e.g., parser files, processor specific-architecture binaries, routing protocol files, etc.). This means that the selection of the boot image is based on type/location, while the selection of software packages and package contents is based on features. Nodes of the same type may have different feature requirements (and hence receive different software) if, for example, their firmware is programmed differently or they are dynamically assigned a different role.

The configuration manager module 703 sends the node verification module 704 the node's type information to obtain the node's software configuration information. The node verification module 704 finds the node's software configuration information in the node database 706 using the node's type information. The node 702 can be a member of a class which dictates the node's software configuration or can be individually configured. The node verification module 704 passes the node's software configuration information to the configuration manager module 703.

In the alternative embodiment described above, the previous steps change slightly, the configuration manager module 703 sends the node verification module 704 the node's features request to obtain the node's software configuration information. The node verification module 704 creates the node's software configuration information based on the node's requested features by matching the node's requested features with package and file information in the node database 706. The node verification module 704 passes the node's software configuration information to the configuration manager module 703.

The configuration manager module 703 sends the package delivery manager module 705 the node's software configuration information to obtain the proper boot image and software packages for the node 702. The package delivery manager module 705 receives the node's software configuration information and finds the boot image and software packages in the package database 707 using the software version information contained in the node's software configuration information. The package delivery manager module 705 passes the boot image and software packages to the configuration manager module 703.

The configuration manager module 703 sends the boot image and software packages to the software installer module 709. The software installer module 709 stores the boot image and software packages in the persistent storage 710. The software version information is extracted from the software packages and stored in the persistent storage 710. The software installer module 709 signals the boot manager module 708 to reboot the node.

The boot manager module 708 reboots the node into the boot image from the persistent storage 710 and the boot manager module 708 signals the software installer module 709 to verify the software package versions with the master node 701. The software installer module 709 retrieves the stored software version information from the persistent storage 710 and requests verification of the software packages from the configuration manager module 703.

The configuration manager module 703 requests verification of the software version information for the node from the node verification module 704. The node verification module 704 compares the node's software version information with the stored versions for the node and returns the result to the configuration manager module 703. If the node has the correct software, then the configuration manager module 703 notifies the software installer module 709 that it can complete the boot sequence. The configuration manager module 703, in turn, notifies the boot manager module 708 that it can execute the software packages stored in the persistent storage 710.

If the node does not have the correct software versions, the configuration manager module 703 retrieves the correct software packages from the package delivery manager module 705, passing the package delivery manager module 705 the desired software package names and their version numbers. The package delivery manager module 705 finds the software packages in the package database 707 and sends them to the configuration manager module 703. The configuration manager module 703 sends the software packages to the software installer module 709.

The software installer module 709 receives the software packages and stores them in persistent storage 710. The software installer module 709 then notifies the boot manager module 708 that it can continue with the boot phase using the software packages stored in persistent storage 710.

During normal runtime, the node 702 is running in its normal operational mode. The user can cause a software update to occur by installing an image onto the master node 701. The composite image is as described above and may contain any combination of boot images and software packages. The configuration manager module 703 passes the boot image(s) and/or software package(s) extracted from the composite image to the package delivery manager module 705. The package delivery manager module 705 installs the boot image(s) and software package(s) into the package database 707. The package delivery manager module 705 compares the binary signature of the modules in the software packages with the corresponding modules stored in the package database 707 to discover which modules have been updated. Any binary signatures that match indicate that the module has not changed. Modules that have different binary signatures replace the modules stored in the package database 707.

The user indicates to the configuration manager module 703 what nodes and which software package(s) are to be updated. The software package(s) may indicate the type of nodes to which they apply. The composite image may also contain a list of software packages destined for each node.

The configuration manager module 703 notifies the software installer module 709 that a software update is being requested. The configuration manager module 703 passes the software installer module 709 the identity of the software package(s) to be updated and the module dependencies. The software installer module 709 sends the software package(s) identifiers and the module dependencies to the system manager module 711.

The system manager module 711 examines the package identifiers and the dependencies. It determines the running processes that will be affected by the update. The system manager module 711 notifies the processes that have indicated interest in updates that the update is being requested. These processes evaluate the effect that the update will have on their operation. For example, if updating a DLL will cause a process that is vital to the node's continuous operation, then when the process is notified that the library is being updated, it will indicate that the update will have a negative impact on the node's operations. On the other hand, if updating another process, for example, does not impact the process, then the process will indicate that the update is okay. If any of the processes determine that the update will degrade or have a negative impact on the operation of the node 702, the process will return a veto to the system manager module 711. If there are no negative effects, the process will return an acceptance of the update to the system manager module 711.

The system manager module 711 waits for the processes to return the results of their evaluations. Once all of the processes have reported in to the system manager module 711, the system manager module 711 notifies the software installer module 709 if any of the processes have vetoed the update. If one process vetoes the update the software installer module 709 returns a veto to the configuration manager module 703. Otherwise, the software installer module 709 returns an acceptance to the configuration manager module 703.

If the configuration manager module 703 receives an acceptance from the software installer module 709, then the configuration manager module 703 requests the software package(s) from the package delivery manager module 705, passing the package delivery manager module 705 the desired software package names and their version numbers. The package delivery manager module 705 locates the software package(s) in the package database 707 and sends them to the configuration manager module 703. The configuration manager module 703 sends the software package(s) to the software installer module 709.

The software installer module 709 installs the software package(s) by either running the modules in the software package or first storing the software package(s) in the persistent storage 710. If the software installer module 709 immediately runs the software package modules, the system manager module 711 loads the modules from the software package(s) into temporary memory (RAM) and signals the processes that are being replaced and the affected processes that the changeover is going to occur. The software installer module 709 compares the binary signature of the modules in the software packages with the corresponding modules stored in RAM to discover which modules have been updated. Any binary signatures that match indicate that the module has not changed. Modules that have different binary signatures replace the modules stored in RAM.

When all of the processes indicate that they are ready and waiting for the changeover, the system manager module 711 starts the new modules and signals the other processes that the changeover has occurred. Each module gracefully restarts, in addition to any affected modules that need to restart as a result of the changeover. The node 702 continues with normal operations.

A module gracefully restarts by saving any variables that it needs and shutting itself down before being switched over to the new module. The new module is started and it uses any saved variables to bring itself back to the state of the old module.

The node 702 can later regress back to the previous modules stored in the persistent storage 710 if it restarts or the configuration manager module 703 tells it to regress.

If the software installer module 709 is going to store the software package(s) in the persistent storage 710, it extracts the version information and dependency information of the software package(s) and stores the information in the persistent storage 710. The software installer module 709 compares the binary signature of the modules in the software packages with the corresponding modules stored in the persistent storage 710 to discover which modules have been updated. Any binary signatures that match indicate that the module has not changed. Modules that have different binary signatures replace the modules stored in the persistent storage 710.

The system manager module 711 loads the modules from the software package(s) and signals the processes that are being replaced and the affected processes that the changeover is going to occur. When all of the processes indicate that they are ready and waiting for the changeover, the system manager module 711 starts the new modules and signals the other processes that the changeover has occurred. Each module gracefully restarts, in addition to any affected modules that need to restart as a result of the changeover. The node 702 continues with normal operations.

If the configuration manager module 703 receives a veto from the software installer module 709, the configuration manager module 703 does not update the node 702 and notifies the user that the update will adversely affect the node 702. If the user was updating more than one node, the update will not occur if a node vetoes the update. The user must then make the decision whether to update some or all of the nodes, or to abort the update.

If the user decides to continue with the update, the configuration manager module 703 requests the software package(s) from the package delivery manager module 705, passing the package delivery manager module 705 the desired software package names and their version numbers. The package delivery manager module 705 locates the software package(s) in the package database 707 and sends them to the configuration manager module 703. The configuration manager module 703 sends the software package(s) to the software installer module 709.

The software installer module 709 extracts the version information and dependency information of the software package(s) and stores the information in the persistent storage 710. The software installer module 709 compares the binary signature of the modules in the software packages with the corresponding modules stored in the persistent storage 710 to discover which modules have been updated. Any binary signatures that match indicate that the module has not changed. Modules that have different binary signatures replace the modules stored in the persistent storage 710

The system manager module 711 loads the modules from the software package(s) and signals the processes that are being replaced and the affected processes that the changeover is going to occur. When all of the processes indicate that they are ready and waiting for the changeover, the system manager module 711 starts the new modules and signals the other processes that the changeover has occurred. Each module gracefully restarts, in addition to any affected modules that need to restart as a result of the changeover.

The node 702 continues with normal operations and the software installer module 709 notifies the configuration manager module 703 that it has completed the update. The configuration manager module 703 checks the dependencies of the software package(s) for the update to ensure that any inter-nodal dependencies are complete. The configuration manager module 703 also checks that the intra-node dependencies are complete. If there are any discrepancies, the configuration manager module 703 notifies the user.

Figure 8:
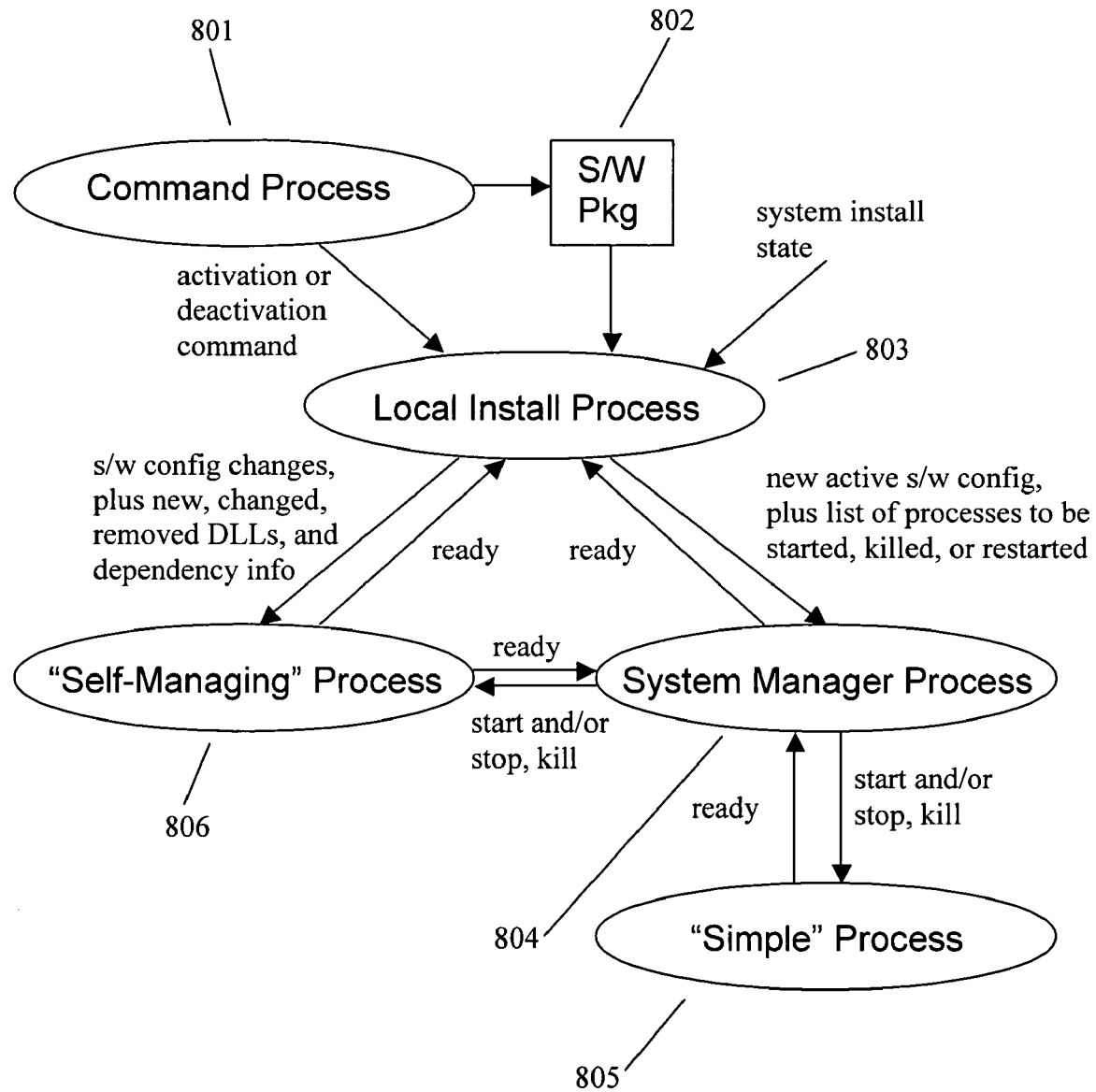
FIG. 8 is a block diagram that illustrates a task viewpoint of a node according to the invention.

FIG. 8 shows a more detailed task viewpoint of the node processes. A build and install infrastructure work together with some key components such as the system manager process 804 to provide the required support. At the lowest level, information on dynamic link library (DLL) dependencies is statically computed during build and embedded in software packages 802. These data are extracted on the node by the install process 803 and the information is passed to the system manager process 804. The system manager process 804 then terminates and starts processes (in a prescribed order) to achieve a sane software configuration while avoiding any direct involvement by code within most processes. There are two types of processes (Self-Managing 806 and Simple 805) that are described in detail below.

Simple processes are defined to be processes that:

Statically link against the DLL stub libraries for all DLLs that they directly use.

Do not directly or indirectly use any DLLs which refer to other DLLs.

Are tolerant of being terminated and restarted upon package activation/deactivation.

Note: Deactivation terminates a process.

Simple components are defined to be components that export only simple processes, or no processes at all. The majority of processes are Simple in this sense. Other processes with special needs cannot handle software activation/deactivation events appropriately through inaction, as the majority can.

Becoming Self-Managing requires processes to contain code to accept change notifications from the install process 803. The process acts appropriately upon receipt of the notifications (determine if it is impacted, and if so restart itself, or close and reopen DLLs). When a Self-Managing process is finished handling the software change, it must signal readiness to the install process 803. In this way, the process can reduce the likelihood that it will be preemptively restarted in response to a software change.

Any processes which depend upon knowing when new versions of other types of files become active, by either activation or deactivation, need to become Self-Managing with respect to those files. That is, any processes which need to monitor the activation/deactivation of other types of files other than DLLs will need to receive notification of active software configuration change events and respond appropriately to handle these other types of files. These processes may still be able to continue to participate as Simple processes for the purposes of handling process restart.

The following describes the additional responsibilities levied upon Self-Managing processes. The build environment (described in further detail below) statically analyzes DLL dependencies and embeds this information into the software packages 802 being delivered to the install process 803 for extraction according to the requirements below:

The build environment provides DLL dependency information at the level of individual processes and DLLs.

The build environment provides information within the software package files specifying which DLLs are directly and transitively used by any DLL or process (i.e., DLL usage information is required for DLLs that use other DLLs).

The build environment provides information within the software package files specifying which processes are Self-Managing with respect to restart. Component owners annotate this information in the Export declarations of the processes within their component files.

The build environment embeds an individual and highly reliable signature value (e.g., an MD5 signature) for each DLL and process in the software packages 802. The signature changes when the corresponding file changes substantively, and does not change when it is simply built at a different time or in a different location.

The build environment should also allow processes and DLLs to manually annotate their dependencies on other DLLs when they access these DLLs by a means that prevents the infrastructure from automatically detecting this dependency.

It is the job of the install process 803 to extract information embedded in the software packages 802, and to communicate information about software activation/deactivation events to other components that need to know. Since the system manager process 804 provides the infrastructure to help most other components to handle software activations and deactivations without much coding of their own, the install process 803 communicates closely with the system manager process 804 to facilitate this, including providing the system manager process 804 with lists of processes to be started, killed or restarted, etc. The install process 803:

calculates, upon each package activation or deactivation, the set of processes that directly needs to be started, killed, or both killed and restarted regardless of dependencies. This set may include Self-Managing processes.

calculates, upon each package activation or deactivation, the set of DLLs that are being directly added, changed or removed.

obtains transitive dependency information for each DLL and process that will be active in the system once the activation/deactivation is processed.

retrieves other metadata identifying those Self-Managing processes that will be active in the system once the activation/deactivation is processed so it can filter them only from the list of dependent processes it sends to the system manager process 804 for restart.

provides means to notify interested processes (including all Self-Managing processes) of package activations/deactivations and provide associated means to retrieve information about DLL interdependencies (i.e., transitive dependency information), and about the sets of DLLs being added, removed, and changed at any package activation/deactivation.

provides adequate information to the system manager process 804 for it to manage processes as described above. This is covered in more detail below.

compares the file signatures embedded into the software package by build tools in order to determine which files (DLLs and/or processes) have actually changed at any package activation/deactivation.

provides the ability to handle batches of activations/deactivations in a single command, the ability to script installs, etc.

provide a function for processes to signal the completion of their handling of software change events. If a Self-Managing process does not respond by calling this function after a suitable timeout, the install process 803 must ask the system manager process 804 to restart those processes that have not responded.

provides a rich API so that processes can request information about such things as the set of new, changed, and removed DLLs in the current software activation or deactivation.

provides an API to permit processes to register for notification when the activation or deactivation completes.

The system manager process 804 is responsible for handling the start up, termination, or restart of Simple processes on any specific node in response to software activation/deactivation events. This is accomplished through close co-operation with the install process 803 (or its analogue on nodes). The local install process 803 provides the system manager process 804 with:

the new processes.

the obsolete processes.

the changed processes (where a different version will be active after the activation/deactivation).

the dependent processes (the processes that are dependent upon the set of DLLs being added, changed or removed by this activation/deactivation—this dependent list is the only list of processes that is pre-filtered by the install process 803 to remove any processes which have declared themselves to be Self-Managing).

The system manager process 804 then embarks upon its process of starting, killing and restarting processes using the data above.

The above infrastructure is provided to support two sets of processes:

processes contained in the package being activated/deactivated (these may be Simple or Self-Managing, and elements of this first set will be affected equally regardless of which type they are); and only those dependent processes that are Simple.

The system manager process 804 has no need to maintain state information about anything except those processes that are currently running (and transitionally for those which are in the process of being started, terminated or restarted). At each software activation or deactivation, the system manager process 804 receives new information from the install process 803 about what the next state should be with respect to which processes should be running when the system has achieved stability after the software activation event from the command process 801. The system manager process 804 is responsible for implementing the transition from the current state (of which processes are running prior to the activation/deactivation) through to the specified post-activation/deactivation state after receiving this information from the local install process 803. When the transition is complete, system manager process 804 informs the install infrastructure that the Simple processes have been migrated to the new software configuration.

Self-Managing processes bear a similar responsibility for managing their own transition. If a Self-Managing process fails to signal its readiness to continue after a software change event, then install process 803 may ask the system manager process 804 to restart that process.

The system manager process 804 receives information from the local install process 803 (as described above) outlining which processes to start, terminate, or restart either in response to a software activation/deactivation event or when a Self-Managing process fails to signal readiness.

The system manager process 804 manages the transition to the new stable state for these processes, by starting, terminating and restarting processes in a timely manner so that the system as a whole can rapidly converge to a new, sane, software configuration. When complete the system manager process 804 informs the install infrastructure of this.

Simple processes are those processes for which all of their DLL dependencies are statically known at build time and which are tolerant of being terminated and restarted by the system manager process 804 on very short notice. This implies that the process cannot directly or indirectly use any DLL whose dependencies are not statically known at build time.

Simple processes may elect to be unaware of software package activation and deactivation events. If it is impacted by a software change, a Simple process will be sent a signal by the system manager process 804 and then a short while later it will be killed if it has not exited. If following the software change event, this process is still required then it will be restarted.

Simple processes also signal to system manager process 804 that they have been successfully started.

As noted previously, all processes Simple or Self-Managing that access other types of files beside DLLs can handle any changes in the active versions of those files on their own. Processes with this need may still be able to participate as Simple processes for the purposes of handling DLL dependencies and process restart.

Simple processes should gracefully exit rather than being killed by system manager process 804 in the case that a software change event impacts them. This may not be required for some processes.

Simple processes that need to access other file types that may be delivered, changed and removed by software package activation/deactivation handle internally the arrival, change or removal of these files. These processes do not need to be self-managing with respect to DLL access and process restart (i.e., they may continue to function as simple processes in this regard).

Self-Managing processes are processes that accept complete responsibility for their own handling of software activations and deactivations. Self-Managing processes register for software configuration change notifications. When they receive these notifications they query the install process 803 for additional information on whether any of the DLLs they depend upon statically were impacted (directly or indirectly) and whether any of the DLLs they have opened dynamically were impacted (directly or indirectly). They then act accordingly (e.g., by closing and reopening any dynamically opened DLLs as necessary, or they may simply ask the install code to perform the default action and restart them if they are impacted).

Note that regardless of whether a process has dependencies upon changing DLLs, if a changed version of that process is present in the package being activated, or deactivated, then the process will be started, killed or restarted as a direct result. When an altered binary becomes active, the previous version (if any) needs to stop, and the new version (if any) needs to start. This is independent of DLL usage.

Self-managing processes have all the same requirements as Simple processes plus:

Self-Managing processes register with the install process 803 for "Software Change" notifications.

Self-Managing processes handle all software change events internally (e.g., by closing and reopening any relevant DLLs they are using), or by some other means ensure that their use of DLLs is appropriate after package activations and deactivations (perhaps by simply restarting).

Self-Managing processes signal the completion of their handling of the software change event. If a Self-Managing process does not respond by calling this function after a suitable timeout, the system manager process 804 may be asked to restart this process.

The system manager process 804 process starts new Self-Managing processes and also kills Self-Managing processes that are being removed from the system. When a version of the process binary, different from the currently active one, is activated or deactivated, the system manager process 804 will also restart the Self-Managing process. In this respect, Self-Managing processes are no different from Simple processes. That is, the list of processes sent by the local install process 803 to the system manager process 804 contains two subsets: directly impacted processes and dependent processes. All directly impacted (e.g., changed) processes of either type are passed to the system manager process 804, but only the Simple dependent processes are passed. No Self-Managing processes are included in the dependent process list.

The relevant install process 803 command process 801 commands here are "activate" and "deactivate". These are the commands that change the active software configuration.

Both the install process 803 and system manager process 804 are interested in knowing when processes become "ready" after either being started (system manager process 804 and install process 803) or after being told that a software change event has occurred (install process 803).

2.6 Development and Build Environment for Packaged Software Delivery to Network Devices A development and build environment is provided to create the information used by the master node and nodes to perform a software load and evaluation during boot and normal runtime. As discussed above, modules that are destined to be a running process on the node are configured such that they have the intelligence to evaluate an incoming software update and determine if the update will affect the node's operational performance. The invention's build environment creates the metadata and dependency data used by the node for the package and module dependency checks.

Figure 9:
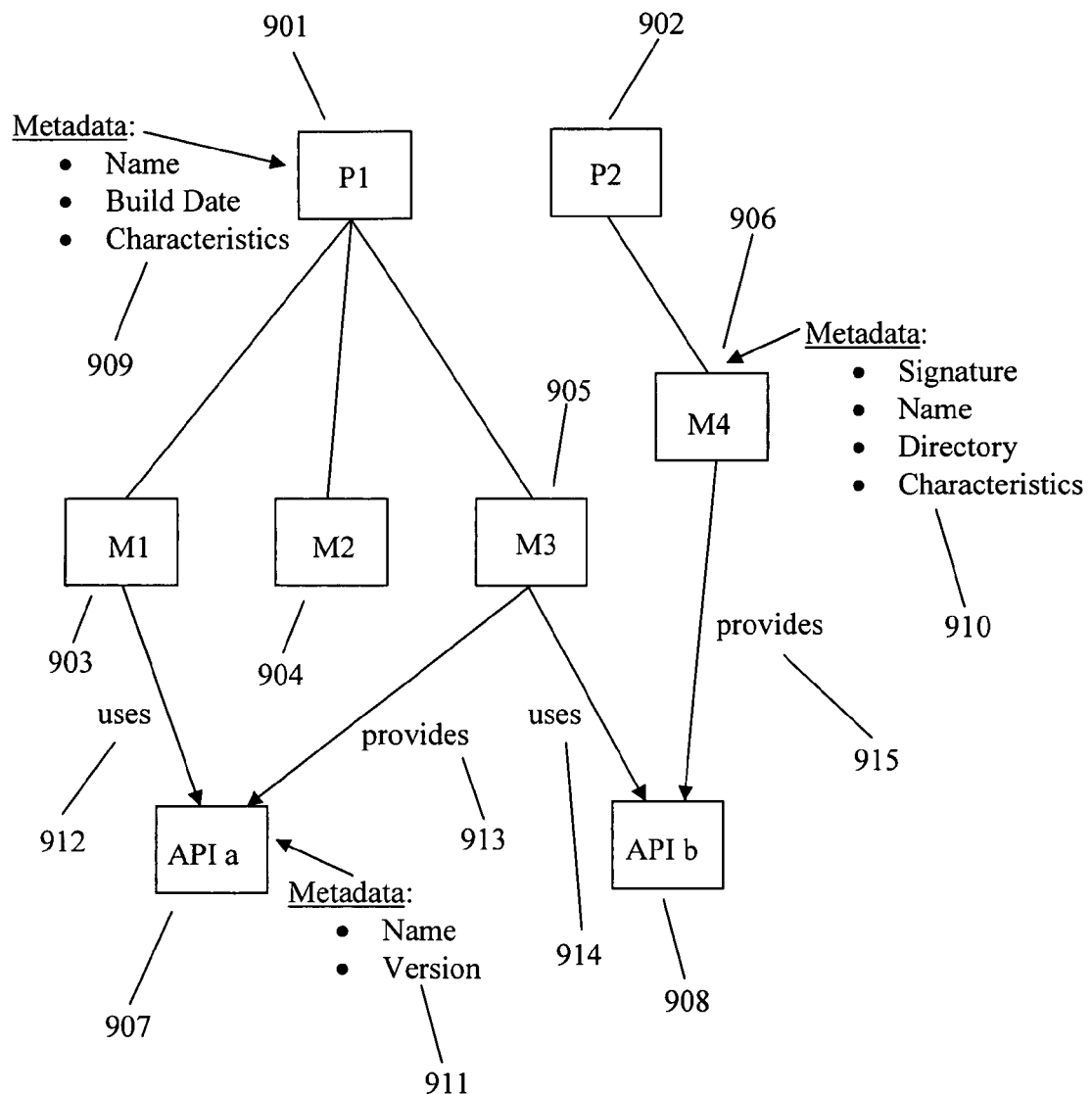
FIG. 9 is a block diagram that illustrates a package structure created by the invention's build environment according to the invention.

Referring to FIG. 9, Source code files are compiled into executable file images (modules) by the build environment. A module can contain an image for a process or a DLL. The build environment creates metadata for the modules that includes information such as the module's: binary signature (e.g., MD5 signature), name, directory path, and characteristics. Each module 903-906 has its metadata 910 inserted into the module.

Figure 10:
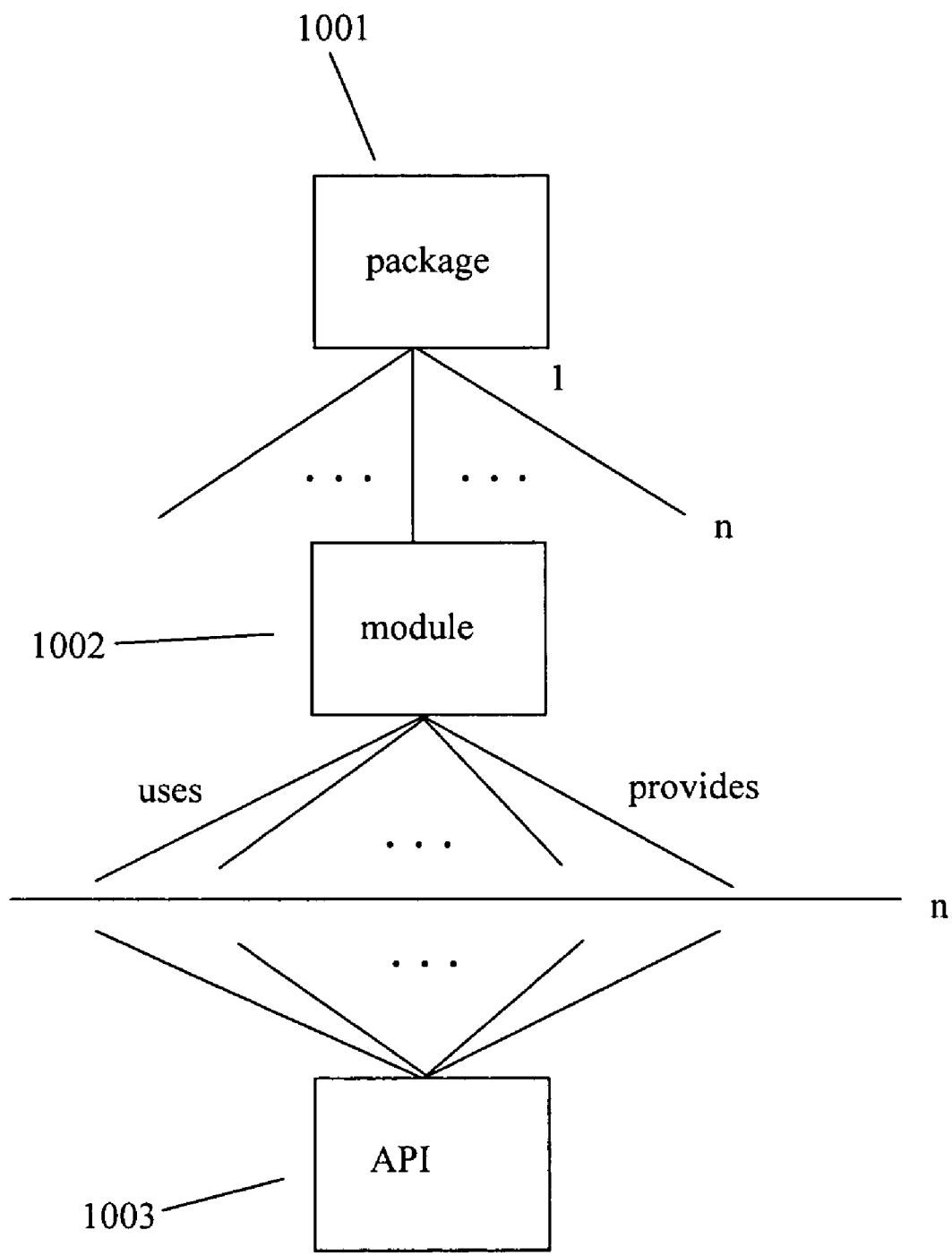
FIG. 10 is a block diagram that illustrates a package, module, application program interface (API) relationship according to the invention.

During the link phase, the build environment gathers API dependency information for each module. A module can provide and use many APIs. FIG. 10 shows the relationship between packages, modules, and APIs. A package 1001 has a one-to-n relationship with modules where a package 1001 can contain n modules 1002. A module 1002 has an n-to-n relationship with APIs where a single module can use and provide n APIs. An API 1003 can be used and provided by n modules.

API dependencies can be calculated in two steps. A linker provides a list of dependent files for a given server or DLL, while the meta-data for each dependent file gives the API names and versions that the server or DLL depends on. Users of a DLL are assumed make use of each function that it exports. The extra abstraction of the API allows a server or DLL to be linked against a special stub library at build time and then bound against any implementation library that is chosen at runtime.

Some dependencies are not derivable from the linker. For example, some processes are not able to use the automatic stub library mechanism because they need to get access to protected data and such from within the library. In other cases, a process may need to select from among several different libraries that implement the same function and cannot use a linker because of name conflicts. Explicit supplemental dependencies are used in the module specification. The build environment collects these directly from the module specification and encodes them in the module meta-data just as it does with the linker-generated data. Explicitly defined and discovered dependencies are treated identically outside of the build environment.

Some processes and DLLs call functions in a specific API only when they are sure that the API is available. These special relations are also annotated in the module specifications.

The build environment creates metadata for each API 907, 908 that includes information such as the API's name and version. Each module has its API dependency information inserted into the module. For example, a module M1 903 uses API a 907. Module M3 905 provides API a 907 and uses API b 908. Module M4 provides API b 908. this dependency information is used by a node's processes to determine the impact that an update will have upon the process and the node.

A binary signature is created for each module 903-906 and inserted into the respective module. Each unique version of a module will have a unique binary signature. The master node uses the binary signatures to discover what modules have changed in a package. The master node compares the binary signature of a module in an update with the corresponding module in its package database. If the binary signatures match, the master node does not replace the module in the package database because there was no change in the module. If the binary signatures do not match, then the master node adds the new version of the module to the package database. As noted above, the master node saves all versions of software packages. A module will only be removed from the package database as part of a user-initiated operation to remove a package or set of packages, and then only if none of the remaining packages reference this version (i.e., the same binary signature) of the module.

The nodes perform the same type of check using a module's binary signature. A node compares the binary signature of each module in a package to the corresponding module's binary signature. If the binary signatures do not match, then the node knows that the module has been updated and should be replaced.

The build environment creates packages based on features/characteristics (e.g., a line card feature) or purpose (e.g., software update). For example, package P1 901 contains three modules M1 903, M2 904, and M3 905 and package P2 906 contains one module M4 906. The build environment creates metadata 909 for each package 901, 902 that includes information such as the package's: name, build date, and characteristics. It inserts the metadata into the package.

The master node uses the package metadata 909 for node requests and to track package versions. For example, a node can request software packages from the master node based on features. The master node matches the node's feature request with package metadata to find the appropriate package(s) that provides modules with the correct features.

2.7 Software Change Modeling for Network Devices in a Dynamic Loading, Installation, and Activation System Software change modeling allows a user to simulate a software change to a system. The user can discover what effects a software update will have on a node or a set of nodes without actually impacting the router or computer network. Software changes for these multi-node systems must be designed to have low impact to the running system keep it highly available. Code interdependencies in the code base can entangle large portions of the code into indivisible entities such that if any of the entangled code is upgraded, all of the code in the system is impacted by the software change. The code portions that are of more interest are "server" processes which run continuously and persistently, much like UNIX daemon processes. It is an important part of reducing the impact of software changes to identify these entangled portions of the code and to take actions to disentangle them, and ameliorate the impact of changing that software. Testing to discover this information would be slow and costly.

The invention provides dynamic (executed directly on the node) and static (executed externally on a stand-alone computer) change modeling. The same source code and libraries are used for the dynamic and static modeling applications. This allows a user to see the impact of activating or deactivating certain modules without affecting the actual node.

Referring again to FIG. 7, the dynamic modeling gives the user 712 command line access to the master node 701. The configuration manager module 703 allows the user to invoke operations upon the node 702. The user 712 installs a software update image onto the master node 701 via the configuration manager module 703 as described above. The user 712 instructs the configuration manager module 703 to perform the software update using a test mode where the update is not put into effect. The configuration manager module 703 does not save the update into the package database 707.

The configuration manager module 703 notifies the software installer module 709 that a software update is being requested. The configuration manager 703 passes the software installer module 709 the identity of the software package(s) to be updated and the module dependencies. The software installer module 709 sends the software package(s) identifiers and the module dependencies to the system manager module 711.

The system manager module 711 examines the package identifiers and the dependencies. It determines the running processes that will be affected by the update. The system manager module 711 notifies the processes that have indicated interest in updates that the update is being requested. These processes evaluate the effect that the update will have on their operation. If any of the processes determine that the update will degrade or have a negative impact on the operation of the node 702, the process will return a veto to the system manager module 711. If there are no negative effects, the process will return an acceptance of the update to the system manager module 711.

The system manager module 711 waits for the processes to return the results of their evaluations. Once all of the processes have reported in to the system manager module 711, the system manager module 711 notifies the software installer module 709 if any of the processes have vetoed the update. If any processes veto the update the software installer module 709 returns a veto to the configuration manager module 703 and a list of the processes that are impacted along with the reasons why. Otherwise, the software installer module 709 returns an acceptance to the configuration manager module 703.

The configuration manager module 703 reports the results to the user 712. If there were any nodes that vetoed the update, the configuration manager module 703 displays the node identifier and the processes that are impacted and their reasons to the user. The configuration manager module 703 can also display the nodes that have later been updated.

The update never occurs and the node 702 is not sent the update. This allows the user 712 to simulate a software update without impacting the node 702.

Figure 11:
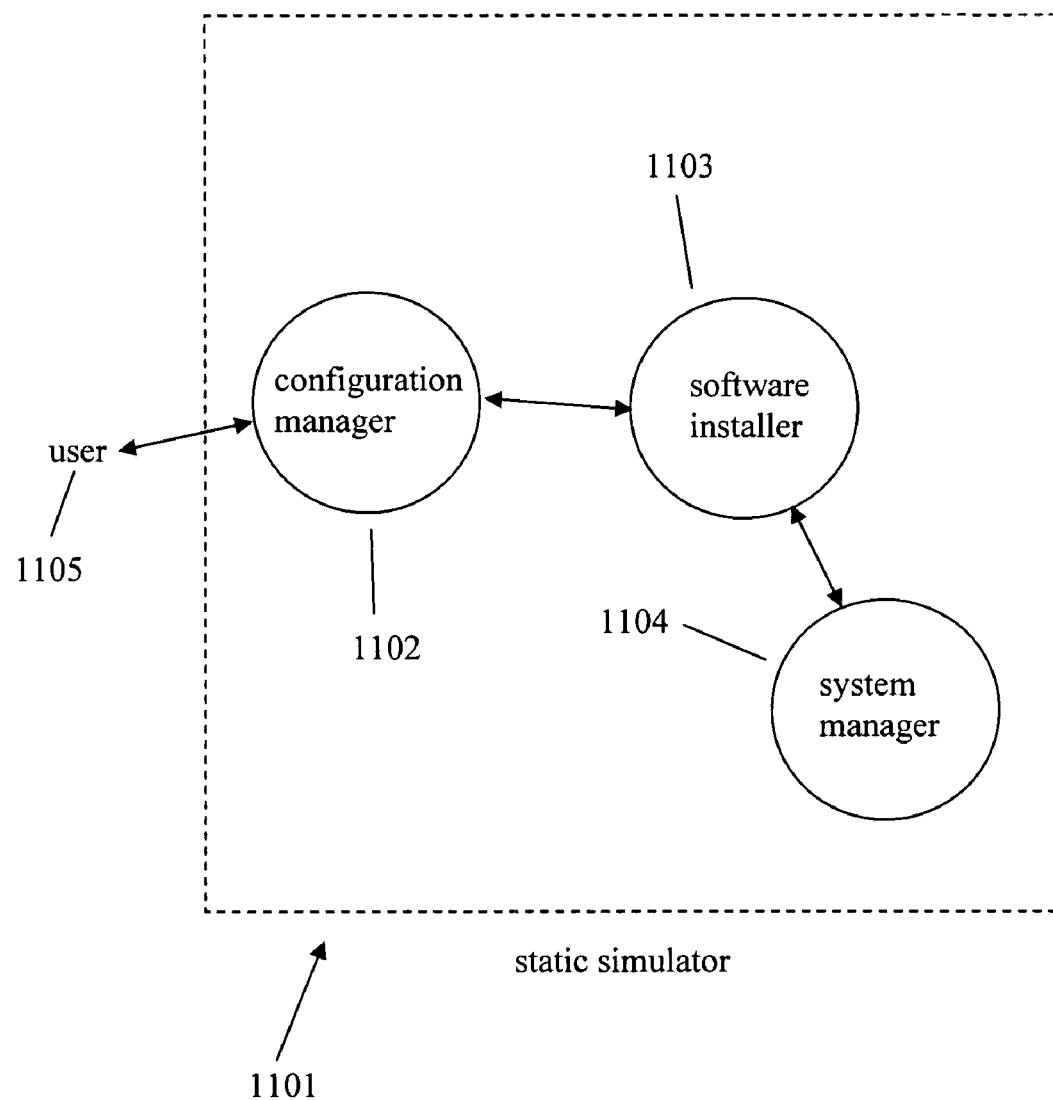
FIG. 11 is a block diagram that illustrates a task viewpoint of a static simulator according to the invention.

Referring to FIG. 11, The static simulator 1101 uses the same software components normally run on the master node but executes them on a stand-alone computer system. The configuration manager module 1102 can calculate the impact of a software change operation on a specific type of node given information about the current software configuration of that node. That is, the user 1105 tells the configuration manager module 1102 the current software configuration by providing the original software images. The user 1105 also indicates to the configuration manager module 1102 the type of the node being analyzed. Then the user 1105 may request the simulation of any software update by providing the updated software image to the configuration manager module 1102. Software downgrades may be similarly simulated.

Alternatively, the static simulator 1101 uses the same software components normally run on the master node and node in a stand-alone computer system. Multiple nodes can be simulated at once to allow the user 1105 to simulate the entire multi-node system. The configuration manager module 1102, software installer module 1103, and system manager module 1104 code are compiled to run on a computer simulating the master node and node. The software installer module 1103 acts as the main controller module for the node software. While the configuration manager module 1102 performs the main command interpreter for the static simulator. The update evaluation logic used in the processes that run on the node are compiled to run on the simulator 1101 as minimalized processes. The user 1105 installs a software update on the simulator 1101 by pointing the configuration manager module 1102 to the software update image.

The configuration manager module 1101 notifies the software installer module 1103 that a software update is being requested. The configuration manager 1102 passes the software installer module 1103 the identity of the software package(s) to be updated and the module dependencies. The software installer module 1103 sends the software package(s) identifiers and the package dependencies to the system manager module 1104.

The system manager module 1104 examines the package identifiers and the dependencies. It determines the running processes that will be affected by the update. The system manager module 1104 notifies the simulated processes that have indicated interest in updates that the update is being requested. These processes evaluate the effect that the update will have on their operation. Some processes may require router or system information to make a veto determination. Those processes provide specific simulators that take in the additional data, such as the configuration file from a router, to help the process make its decisions.

If any of the processes determine that the update will degrade or have a negative impact on the operation of the node, the process will return a veto to the system manager module 1104. If there are no negative effects, the process will return an acceptance of the update to the system manager module 1104.

The system manager module 1104 waits for the processes to return the results of their evaluations. Once all of the processes have reported in to the system manager module 1104, the system manager module 1104 notifies the software installer module 1103 if any of the processes have vetoed the update. If any processes veto the update the software installer module 1104 returns a veto to the configuration manager module 1102 and a list of the processes that are impacted along with the reasons why. Otherwise, the software installer module 1103 returns an acceptance to the configuration manager module 1102.

The configuration manager module 1102 reports the results to the user 1105. If there were any nodes that vetoed the update, the configuration manager module 1102 displays the node identifier and the processes that are impacted and their reasons to the user. The configuration manager module 1102 can also display the nodes that have later been updated.

The invention provides the user with tools to modify aspects of the software update so the user can test their impact upon the system.

Update Modification Tool—This tool allows the user to create modified software update files from the files used to create the original update. The modified update will automatically receive a different version number than the original update. This is convenient when the user wants to install a new version of an update over the original update on-the-box. This tool may also be used to create arbitrarily "dirty" updates. That is, zero, one or more files in the pie may be marked dirty (i.e., marked as changed) by this tool. This is to get past the binary signature comparisons in the master node and node.

To Create a "White" Update—A "white" update is an identical update to the original one, with only a different version number. All of the binary signatures for all of the files in the update will remain unmodified. The result therefore is a clean, or "white" update, with nothing marked "dirty".

To Create a "Black" Update—A "black" update is an identical update to the original one, except that the version number is changed, and all of the binary signatures for all of the files in the update are set to random values. The result therefore is a maximally "dirty", or "black" update, with all files marked as changed.

To Create a "Gray" Update—A "gray" update is an identical update to the original one, except that the version number is changed, and the binary signatures for selected files in the update are set to random values. The result therefore is a partially "dirty", or "gray" update, with those specified files marked as changed.

Update Diff Tool—This tool allows the user to compare any two versions of an update to see which files are added, removed, changed or unchanged between them. This tool may also be told to filter the output to show only a subset of the differences between the updates.

3.0 IMPLEMENTATION MECHANISMS

Hardware Overview

Figure 12:
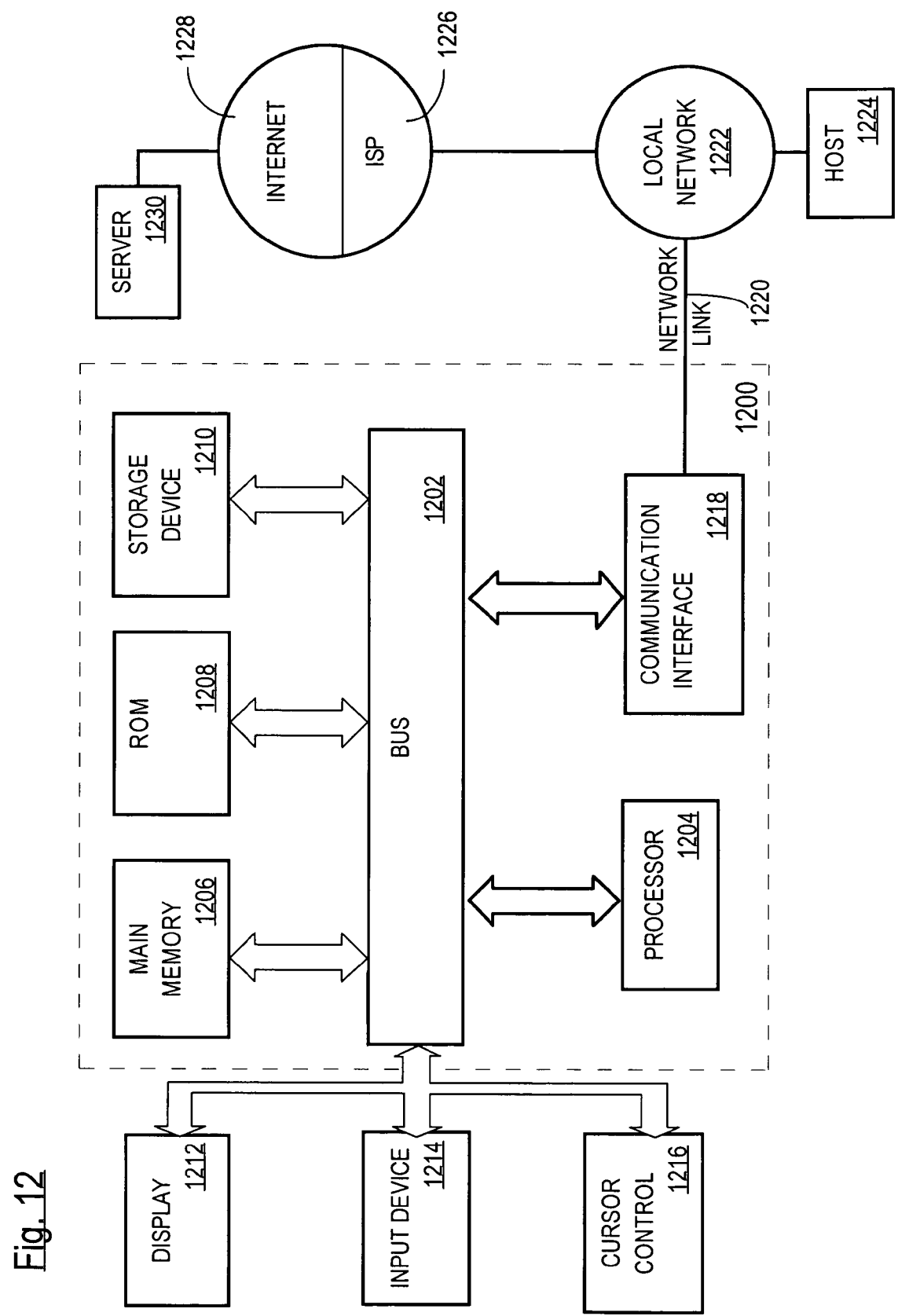
FIG. 12 is a block diagram that illustrates a computer system upon which an embodiment may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus

1202 for processing information. Computer system 1200 also includes a main memory 1206, such as a random access memory ("RAM") or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory ("ROM") 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube ("CRT"), for displaying information to a computer user. An input device 1214, including alphanumeric and other keys, is coupled to bus 1202 for communicating information and command selections to processor 1204. Another type of user input device is cursor control 1216, such as a mouse, trackball, stylus, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for software change modeling for network devices. According to one embodiment of the invention, software change modeling for network devices is provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector can receive the data carried in the infrared signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network ("ISDN") card or a modem to provide a data communication connection to a corresponding type of telephone line. As another example, communication interface 1218 may be a local area network ("LAN") card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider ("ISP") 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application provides for software change modeling for network devices as described herein.

The received code may be executed by processor 1204 as it is received, and/or stored in storage device 1210, or other non-volatile storage for later execution. In this manner, computer system 1200 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of software change modeling of networked nodes on a computer system, the method comprising the computer-implemented steps of:
   simulating, using a software update simulator on the computer system, processes from at least one node of the networked nodes;
   wherein each simulated process is a minimal version of a functional process that runs on said node; and
   receiving a software update for said node by said software update simulator;
   wherein the software update contains a set of one or more software packages;
   wherein each software package of the set contains at least one software module with corresponding software dependency information;
   wherein said software update simulator notifies a control process for said node that a software update is being requested;
   wherein said software update simulator passes said control process identities of the set of one or more software packages to be updated and software dependency information; and
   wherein said control process determines running functional node processes that will be affected by the software update using the software dependency information.

2. A method as recited in claim 1, wherein said control process notifies processes that have indicated interest in software updates that the software update is being requested; wherein each notified process evaluates the effect that the software update will have on its operation; wherein if any of the processes determine that the software update will degrade or have a negative impact on said node's normal operation, the process returns a veto to said control process along with reasons why; and wherein if a process finds that the software update will have no negative effects, the process returns an acceptance of the software update to said control process.

3. A method as recited in claim 2, wherein said control process waits for all of the notified processes to return the results of their evaluations and once all of the processes have reported to said control process, said control process notifies said software update simulator if any of the processes have vetoed the software update along with their reasons.

4. A method as recited in claim 3, wherein said software update simulator displays node identifiers and the processes that have vetoed the software update along with their reasons to a user.

5. A method as recited in claim 1, wherein a user initiates a software update by loading an image containing the software update into said software update simulator.

6. A method as recited in claim 5, wherein the user indicates what nodes and which of the set of one or more software packages are to be updated.

7. A method as recited in claim 1, wherein a software package contains version information, dependency information, and other metadata information pertaining to software in the package.

8. A method as recited in claim 7, wherein the metadata includes a list of application program interface (API) providers and consumers.

9. A method of software change modeling of nodes in a network of nodes on a computer system, the method comprising the computer-implemented steps of:
   executing a software update simulator on said computer system;
   wherein said software update simulator runs software components normally run on a master node in the network of nodes;
   receiving a current software configuration of a node into said software update simulator by receiving current software modules installed on said node;
   receiving a request for a simulation of a software update by receiving an updated software image into said simulator;
   wherein the software image contains a set of one or more software packages;
   wherein each software package of the set contains at least one software module with corresponding software dependency information;
   wherein said software update simulator calculates the software update's impact on said node using a current software configuration of said node; and
   displaying the calculation's results to a user.

10. A method as recited in claim 9, further comprising receiving at said software update simulator the type of node being analyzed.

11. A method as recited in claim 9, wherein said software update is a software downgrade where modules are being removed.

12. An apparatus for software change modeling of nodes in a network of nodes on a computer system, comprising:
   one or more processors
   a software update simulator on said computer system;
   wherein said software update simulator runs software components normally run on a master node in the network of nodes;
   means for receiving a current software configuration of a node, in the network of nodes, into said software update simulator by receiving current software modules installed on said node;
   means for receiving a request for a simulation of a software update by receiving an updated software image into said simulator; and
   wherein the software image contains a set of one or more software packages;
   wherein each software package of the set contains at least one software module with corresponding software dependency information;
   wherein said software update simulator calculates the software update's impact on said node using the current software configuration of said node; and
   means for displaying the calculation's results to a user.

13. An apparatus as recited in claim 12, further comprising means for receiving at said software update simulator the type of node being analyzed.

14. An apparatus as recited in claim 12, wherein said software update is a software downgrade where modules are being removed.

15. A computer-readable storage medium carrying one or more sequences of instructions for software change modeling of nodes in a network of nodes on a computer system, wherein the computer-readable storage medium is one of a volatile or a non-volatile medium, wherein the instructions, when executed by one or more processors, cause the one or more processors to carry out the steps of:
   executing a software update simulator on said computer system;
   wherein said software update simulator runs software components normally run on a master node in the network of nodes;

receiving a current software configuration of a node into said software update simulator by receiving current software modules installed on said node;

receiving a request for a simulation of a software update by receiving an updated software image into said simulator;

wherein the software image contains a set of one or more software packages;

wherein each software package of the set contains at least one software module with corresponding software dependency information;

wherein said software update simulator calculates the software update's impact on said node using a current software configuration of said node; and displaying the calculation's results to a user.

16. A computer-readable storage medium as recited in claim 15, wherein the one or more sequences of instructions include instructions which, when executed by the one or more processors, further cause the one or more processors to carry out the steps of receiving at said software update simulator the type of node being analyzed.

17. A computer-readable storage medium as recited in claim 15, wherein said software update is a software downgrade where modules are being removed.

18. An apparatus for software change modeling of networked nodes on a computer system, the apparatus comprising: one or more processors means for simulating, using a software update simulator on the computer system, processes from at least one node of the networked nodes;

wherein each functional process that is simulated is a minimal version of a functional process that runs on said node; and means for receiving a software update for said node by said software update simulator;

wherein the software update contains a set of one or more software packages;

wherein each software package of the set contains at least one software module with corresponding software dependency information;

wherein said software update simulator notifies a control process for said node that a software update is being requested;

wherein said software update simulator passes said control process identities of the set of one or more software packages to be updated and software dependency information; and wherein said control process determines running functional node processes that will be affected by the software update using the software dependency information.

19. A computer-readable storage medium carrying one or more sequences of instructions for software change modeling of networked nodes on a computer system, wherein the computer-readable storage medium is one of a volatile or a non-volatile medium, wherein the instructions, when executed by one or more processors, cause the one or more processors to perform:

simulating, using a software update simulator on the computer system, processes from at least one node of the networked nodes;

wherein each functional process that is simulated is a minimal version of a functional process that runs on said node; and receiving a software update for said node by said software update simulator;

wherein the software update contains a set of one or more software packages;

wherein each software package of the set contains at least one software module with corresponding software dependency information;

wherein said software update simulator notifies a control process for said node that a software update is being requested;

wherein said software update simulator passes said control process identities of the set of one or more software packages to be updated and software dependency information; and wherein said control process determines running functional node processes that will be affected by the software update using the software dependency information.

20. An apparatus comprising:

a software update simulator on a computer system;

one or more processors;

one or more sequences of instructions which, when executed by the one or more processors, cause the one or more processors to perform:

simulating processes from at least one node on said computer system, wherein each functional process that is simulated is a minimal version of a functional process that runs on said node; and receiving a software update for said node by said software update simulator;

wherein the software update a set of one or more software packages;

wherein each software package of the set contains at least one software module with corresponding software dependency information;

wherein said software update simulator notifies a control process for said node that a software update is being requested;

wherein said software update simulator passes said control process identities of the set of one or more software packages to be updated and software dependency information; and wherein said control process determines running functional node processes that will be affected by the software update using the software dependency information.

21. An apparatus as recited in claim 20, wherein said control process notifies processes that have indicated interest in software updates that the software update is being requested; wherein each notified process evaluates the effect that the software update will have on its operation; wherein if any of the processes determine that the software update will degrade or have a negative impact on said node's normal operation, the process returns a veto to said control process along with reasons why; and wherein if a process finds that the software update will have no negative effects, the process returns an acceptance of the software update to said control process.

22. An apparatus as recited in claim 21, wherein said control process waits for all of the notified processes to return the results of their evaluations and once all of the processes have reported to said control process, said control process notifies said software update simulator if any of the processes have vetoed the software update along with their reasons.

23. An apparatus as recited in claim 22, wherein said software update simulator displays node identifiers and the processes that have vetoed the software update along with their reasons to a user.

24. An apparatus comprising:
a software update simulator on a computer system;
wherein said software update simulator runs software components normally run on a master node in the network of nodes;
receiving a current software configuration of a node into said software update simulator by receiving current software modules installed on said node;
receiving a request for a simulation of a software update by receiving an updated software image into said simulator;
wherein the software image contains a set of one or more software packages;
wherein each software package of the set contains at least one software module with corresponding software dependency information;
wherein said software update simulator calculates the software update's impact on said node using a current software configuration of said node;
one or more processors; and
one or more sequences of instructions which, when executed by the one or more processors, cause the one or more processors to perform displaying the calculation's results to a user.

25. An apparatus as recited in claim 24, wherein said software update is a software downgrade where modules are being removed.

* * * * *